(12) United States Patent
Crowl et al.

(10) Patent No.: US 11,789,157 B2
(45) Date of Patent: *Oct. 17, 2023

(54) SYSTEM AND METHOD FOR PROTECTING AGAINST IMPACT BETWEEN A VEHICLE AND A FACILITY FOR HOUSING THE VEHICLE

(71) Applicant: Hangar Safe Holdings, LLC, Bakersfield, CA (US)

(72) Inventors: Ryan D. Crowl, Bakersfield, CA (US); Knute F. Johnson, Art, TX (US)

(73) Assignee: Hangar Safe Holdings, LLC, Bakersfield, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/576,860

(22) Filed: Jan. 14, 2022

(65) Prior Publication Data

US 2022/0179095 A1    Jun. 9, 2022

Related U.S. Application Data

(63) Continuation of application No. 17/157,677, filed on Jan. 25, 2021, now Pat. No. 11,237,271, which is a continuation-in-part of application No. 16/550,125, filed on Aug. 23, 2019, now Pat. No. 10,950,134.

(51) Int. Cl.
  *G01S 17/933* (2020.01)
  *B64F 1/22* (2006.01)

(52) U.S. Cl.
  CPC ............ *G01S 17/933* (2013.01); *B64F 1/222* (2013.01)

(58) Field of Classification Search
  CPC ........ G01S 17/933; G01S 17/87; G01S 17/88; G01S 17/42; B64F 1/222; B64F 1/22; G08G 5/0026; G08G 5/0082; G08G 5/045; G08G 5/065
  See application file for complete search history.

(56) References Cited

U.S. PATENT DOCUMENTS

| | | |
|---|---|---|
| 3,916,588 A | 11/1975 | Magill |
| 5,359,542 A | 10/1994 | Pahmeier et al. |
| 6,816,086 B1 | 11/2004 | Kieffer, Sr. |
| 7,932,838 B2 | 4/2011 | Hamza et al. |

(Continued)

FOREIGN PATENT DOCUMENTS

| | | |
|---|---|---|
| CN | 204091896 U | 1/2015 |
| CN | 208251755 U | 12/2018 |

(Continued)

*Primary Examiner* — An T Nguyen
(74) *Attorney, Agent, or Firm* — LOZA & LOZA, LLP; David S. Sarisky

(57) ABSTRACT

A method of protecting against impact between a vehicle and a physical structure of a facility having an opening for the vehicle to pass through includes defining a monitored plane relative to an edge of the opening, the monitored plane defined by a plurality of baseline measurements, wherein each of the plurality of baseline measurements: 1) corresponds to a distance between a sensor spaced apart from the edge and one of a plurality of virtual ends of the monitored plane, and 2) is identified by an angle parameter. The method also includes obtaining a subsequent measurement; evaluating the subsequent measurement relative to a corresponding baseline measurement to determine if a criterion indicative of an intrusion of the monitored plane is satisfied; and activating an alarm when the criterion is satisfied.

20 Claims, 19 Drawing Sheets

(56) References Cited

U.S. PATENT DOCUMENTS

| | | |
|---|---|---|
| 8,264,377 B2 | 9/2012 | Griffith |
| 9,091,762 B2 | 7/2015 | Knight |
| 9,469,416 B2 | 10/2016 | Barnes et al. |
| 9,865,147 B2 | 1/2018 | Langford et al. |
| 2008/0062011 A1 | 3/2008 | Butler et al. |
| 2008/0083851 A1 | 4/2008 | Perry et al. |
| 2017/0294132 A1 | 10/2017 | Colmenares |
| 2018/0004212 A1 | 1/2018 | Tang |
| 2018/0047290 A1 | 2/2018 | Min |
| 2019/0108763 A1 | 4/2019 | Bense et al. |
| 2019/0185304 A1 | 6/2019 | Lesquir |

FOREIGN PATENT DOCUMENTS

| | | |
|---|---|---|
| DE | 10011000 B4 | 9/2001 |
| EP | 2522621 A1 | 11/2012 |
| WO | 2017197877 A1 | 11/2017 |

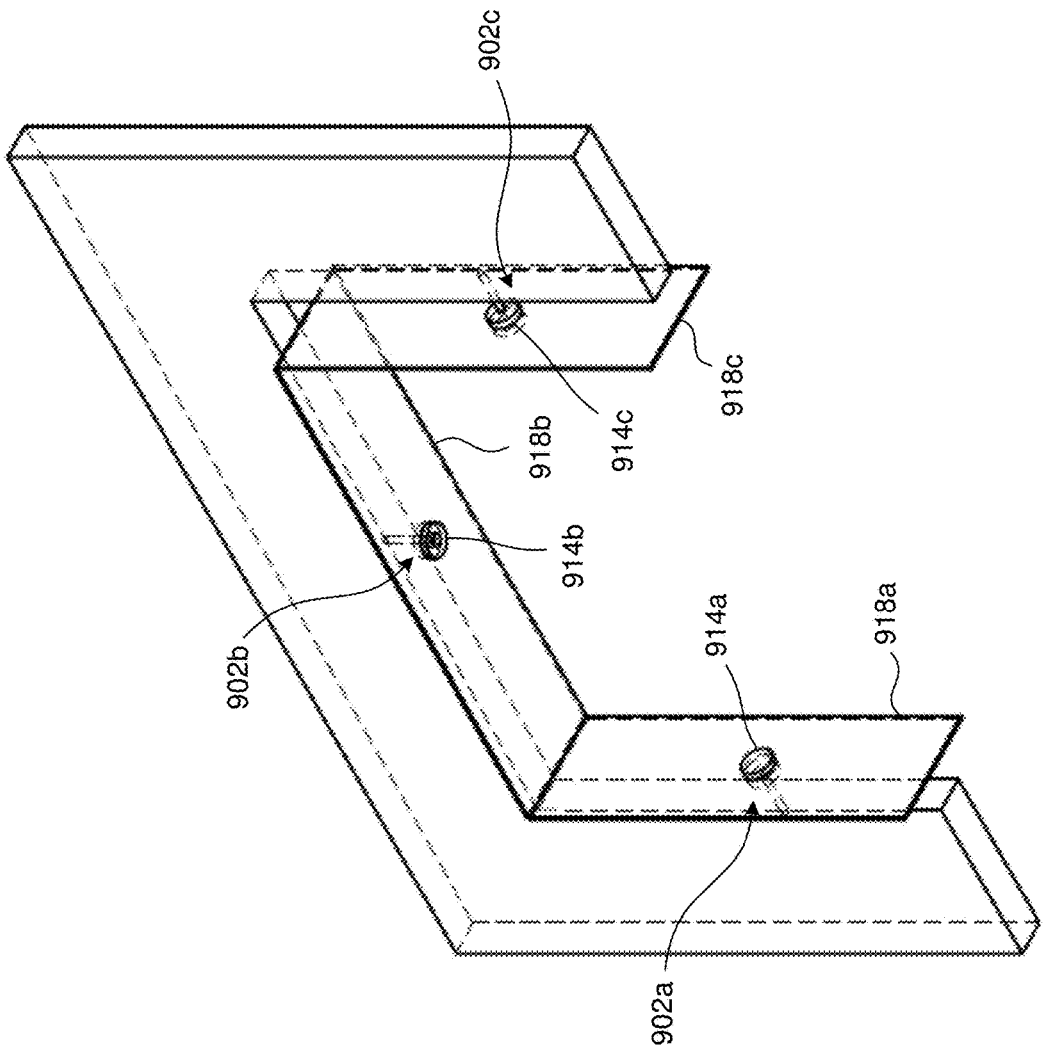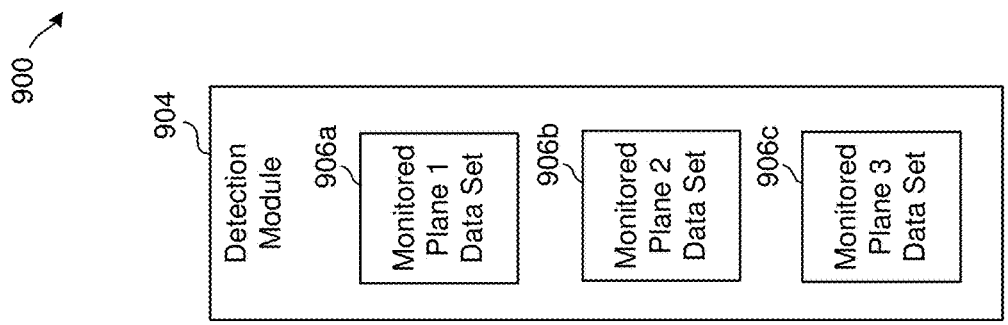
FIG. 9A

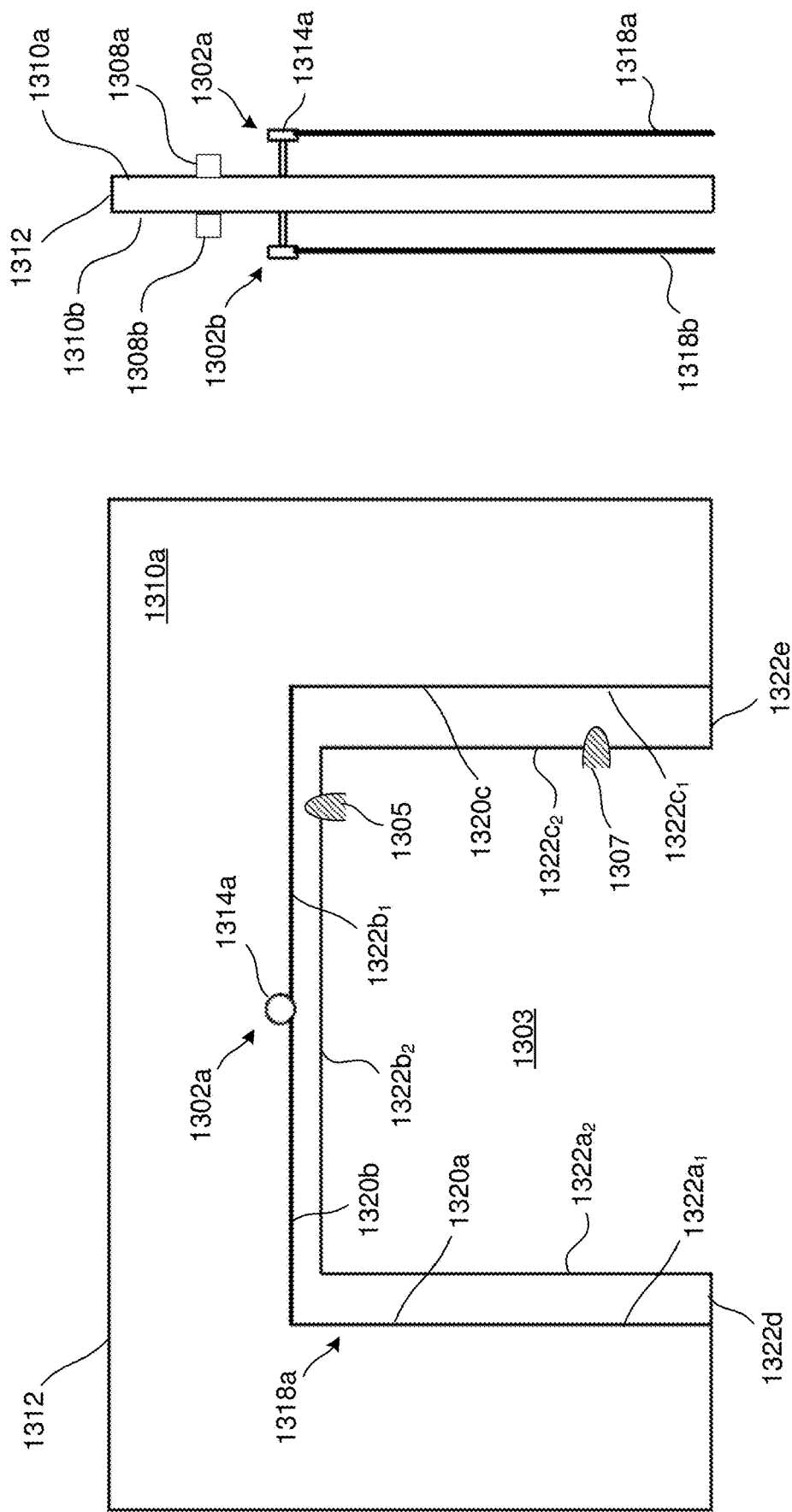

SYSTEM AND METHOD FOR PROTECTING AGAINST IMPACT BETWEEN A VEHICLE AND A FACILITY FOR HOUSING THE VEHICLE

CROSS-REFERENCE TO RELATED APPLICATION(S)

This application is a continuation of U.S. patent application Ser. No. 17/157,677, filed Jan. 25, 2021, now U.S. Pat. No. 11,237,271, for "System and Method for Protecting Against Impact Between a Vehicle and a Facility for Housing the Vehicle," which is a continuation-in-part of U.S. patent application Ser. No. 16/550,125, filed Aug. 23, 2019, now U.S. Pat. No. 10,950,134, for "System and Method for Protecting Against Impact Between a Moving Vehicle and a Facility for Housing the Vehicle," the entire disclosures of which are incorporated herein by reference.

TECHNICAL FIELD

The present disclosure relates generally to protecting against impact between a moving vehicle and a facility for housing the vehicle, and more particularly, to systems and methods that protect the structural integrity of both aircraft and aircraft facilities, such as hangars, as aircraft are moved around within such facilities.

BACKGROUND

Aviation ground handlers move aircraft of all shapes and sizes hundreds of thousands of times each day; across ramps, in and out of hangars, and to and from maintenance facilities. While usually done safely, aircraft under tow occasionally impact buildings, hangars, other aircraft, or equipment. "Hangar rash," as it is commonly referred to, is thought to be the largest source of damage to the worlds fleet of aircraft. Insurance company claims easily extend into the hundreds of thousands of dollars in damages per incident. Many more incidents go unclaimed.

With reference to FIG. 1A, an aircraft located within a hangar may be towed about the hangar by an aircraft tug under control of an aircraft tug operator. The aircraft tug and operator are situated at the nose of the airplane. As such, the view of the operator in the direction of the tail of the airplane is partially obstructed is areas between the nose and the wings, and fully obstructed in areas beyond the wings. In addition, depth perception is difficult at the distances associated with the size of larger aircraft, all of which makes it difficult to see the wings and tail.

With reference to FIG. 1B, because of the obstructed views the aircraft tug operator may inadvertently over tow the airplane toward the back wall of the hangar thereby causing the tail to impact the back wall. Such impact may result in damage to one or both of the aircraft and the hangar wall.

It is therefore desirable to assist aircraft tug operators to prevent incidents of over towing and protect against impact between aircraft and the facilities that house aircraft. The concepts disclosed below address these needs and others.

SUMMARY

The system and method described herein are designed to provide advanced notice to ground crew members, moving aircraft under tow within a facility, when a collision with a structure of the facility or an object within the facility is imminent. The system and method act as an early detection and warning system to notify ground crew members when a part of the aircraft under tow is within a pre-determined distance of a structure or object. The system and method provides both visual and aural warnings to alert ground crew members of an impending collision.

In one aspect of the disclosure, a method of protecting against impact between a vehicle and a physical structure, e.g., a wall, of a facility having an opening or doorway for the vehicle to pass through, includes defining a monitored plane relative to one or more edges of the opening. The monitored plane is defined by a plurality of baseline measurements, wherein each of the plurality of baseline measurements: 1) corresponds to a distance between a sensor spaced apart from the edge and one of a plurality of virtual ends of the monitored plane, and 2) is identified by an angle parameter. The method also includes obtaining a subsequent measurement; evaluating the subsequent measurement relative to a corresponding baseline measurement to determine if a criterion indicative of an intrusion of the monitored plane is satisfied; and activating an alarm when the criterion is satisfied.

In another aspect of the disclosure, a system for protecting against impact between a vehicle and a physical structure of a facility having an opening or doorway for the vehicle to pass through includes a measurement module and a detection module. The opening is defined by a plurality of edges of the physical structure and measurement module is configured to be spaced apart from one of the plurality of edges. The measurement module is further configured to rotate relative to the edge, and obtain a plurality of measurements, wherein each of the plurality of measurements corresponds to a distance from the measurement module.

The detection module is coupled to the measurement module and comprises a definition module that defines a monitored plane relative to the edge. The monitored plane is defined by a plurality of baseline measurements, wherein each of the plurality of baseline measurements: 1) corresponds to a distance between the measurement module and one of a plurality of virtual ends of the monitored plane, and 2) is identified by an angle parameter. The detection module is configured to obtain a subsequent measurement from the measurement module; associate an angle parameter with the subsequent measurement; evaluate the subsequent measurement relative to a corresponding baseline measurement having a same angle parameter to determine if a criterion indicative of an intrusion of the monitored plane is satisfied; and output an alarm activation signal when the criterion is satisfied.

In another aspect of the disclosure, a method of protecting against impact between a vehicle and a physical structure, e.g., wall, of a facility having an opening or doorway for the vehicle to pass through includes defining a monitored frame relative to at least one of the inside surface and the outside surface the physical structure. The monitored frame is defined by a plurality of sets of baseline measurements, wherein each of the plurality of sets of baseline measurements is identified by an angle parameter and includes at least one baseline measurement that corresponds to a distance between a sensor spaced apart from the surface and one of a plurality of virtual ends of the monitored frame. The method also includes obtaining a subsequent measurement; evaluating the subsequent measurement relative to a corresponding set of baseline measurements to determine if a criterion indicative of an intrusion of the monitored frame is satisfied; and activating an alarm when the criterion is satisfied.

In another aspect of the disclosure, a system for protecting against impact between a vehicle and a physical structure of a facility having an opening for the vehicle to pass through includes a measurement module and a detection module. The measurement module is configured to be spaced apart from at least one of an inside surface and an outside surface of the physical structure. The measurement module is further configured to rotate relative to the surface; and obtain a plurality of measurements, wherein each of the plurality of measurements corresponds to a distance from the measurement module.

The detection module is coupled to the measurement module and comprises a definition module that defines a monitored frame relative to the surface. The monitored frame is defined by a plurality of sets of baseline measurements, wherein each of the plurality of sets of baseline measurements is identified by an angle parameter and includes at least one baseline measurement that corresponds to a distance between a sensor spaced apart from the surface and one of a plurality of virtual ends of the monitored frame. The detection module is configured to obtain a subsequent measurement from the measurement module; associate an angle parameter with the subsequent measurement; evaluate the subsequent measurement relative to the set of baseline measurements identified by the angle parameter associated with the subsequent measurement to determine if a criterion indicative of an intrusion of the monitored frame is satisfied; and output an alarm activation signal when the criterion is satisfied.

In one aspect of the disclosure, a method of protecting against impact between a vehicle and a physical structure, e.g., a wall, of a facility having an opening or doorway for the vehicle to pass through, includes defining a monitored area, e.g., a "monitored plane" as previously described or a "monitored frame" as previously described, relative to the opening. The monitored area is defined by a plurality of baseline measurements, wherein each of the plurality of baseline measurements: 1) corresponds to a distance between a sensor spaced apart from a structure, e.g., wall edge or wall surface, that defines the opening and one of a plurality of virtual ends of the monitored area, and 2) is identified by an angle parameter. The method also includes obtaining a subsequent measurement; evaluating the subsequent measurement relative to a corresponding baseline measurement to determine if a criterion indicative of an intrusion of the monitored area is satisfied; and activating an alarm when the criterion is satisfied.

In another aspect of the disclosure, a system for protecting against impact between a vehicle and a physical structure of a facility having an opening or doorway for the vehicle to pass through includes a measurement module and a detection module. The measurement module is configured to be spaced apart from a structure, e.g., wall edge or wall surface, that defines the opening. The measurement module is further configured to rotate relative to the structure, and obtain a plurality of measurements, wherein each of the plurality of measurements corresponds to a distance from the measurement module.

The detection module is coupled to the measurement module and comprises a definition module that defines a monitored area, e.g., a "monitored plane" or a "monitored frame", relative to the structure. The monitored area is defined by a plurality of baseline measurements, wherein each of the plurality of baseline measurements: 1) corresponds to a distance between the measurement module and one of a plurality of virtual ends of the monitored area, and 2) is identified by an angle parameter. The detection module is configured to obtain a subsequent measurement from the measurement module; associate an angle parameter with the subsequent measurement; evaluate the subsequent measurement relative to a corresponding baseline measurement having a same angle parameter to determine if a criterion indicative of an intrusion of the monitored area is satisfied; and output an alarm activation signal when the criterion is satisfied.

In one aspect of the disclosure, a method of protecting against impact between a vehicle and a facility configured to house the vehicle includes automatically entering a protection system into a learning mode. The learning mode may be entered by detecting at a first sensor, a signal transmitted by a second sensor associated with a supplemental vehicle configured to couple with the vehicle and move the vehicle relative to the facility, and responsive to detecting the signal, outputting a control signal that causes the protection system to enter the learning mode. The method also includes creating a first monitored plane relative to a first physical surface of the facility while in the learning mode. The first monitored plane is defined by a plurality of baseline measurements. Each baseline measurement corresponds to a distance between a sensor spaced apart from the first physical surface and an object impeding a beam transmitted by the sensor, and is identified by an angle parameter. The method further includes obtaining subsequent measurements of the plurality of baseline measurements; and evaluating one or more subsequent measurements relative to corresponding one or more baseline measurements to determine if a criterion indicative of an intrusion of the first monitored plane is satisfied.

In another aspect of the disclosure, a system for protecting against impact between a vehicle and a facility configured to house the vehicle, includes a measurement module, a learning module, and a detection module. The measurement module is adapted to be spaced apart from a first physical surface of the facility and is configured to rotate relative to the first physical surface, and obtain a plurality of measurements, wherein each measurement corresponds to a distance between the measurement module and an object impeding a beam transmitted by the measurement module.

The learning module is coupled to the measurement module and is configured to automatically enter a learning mode. While in the learning mode, the learning module is further configured to receive a plurality of measurements from the measurement module corresponding to a plurality of baseline measurements; associate an angle parameter with each of the plurality of baseline measurements; and create a first monitored plane relative to the first physical surface. The first monitored plane is defined by the plurality of baseline measurements and corresponding angle parameters.

The detection module is coupled to the measurement module and is configured to automatically enter a detection mode after creation of the first monitored plane by the learning module. While in the detection mode, the detection module is further configured to obtain one or more measurements from the measurement module, each corresponding to a subsequent measurement; associate an angle parameter with each of the one or more subsequent measurements; and evaluate the one or more subsequent measurements relative to one or more baseline measurements having a same angle parameter to determine if a criteria indicative of an intrusion of the first monitored plane is satisfied.

BRIEF DESCRIPTION OF THE DRAWINGS

Various aspects systems and methods will now be presented in the detailed description by way of example, and not by way of limitation, with reference to the accompanying drawings, wherein:

FIGS. 9A-9C are illustrations of one configuration of a hangar doorway protection system.

FIGS. 13A-13C are illustrations of another configuration of a hangar doorway protection system.

DETAILED DESCRIPTION

Disclosed herein is a protection system and method that protects against impact between a moving vehicle and a facility housing the vehicle. For example, the system and method may protect large physical surfaces or structures, e.g., walls, of a hangar facility from accidental impact by an aircraft under tow. Using a network of sensors placed a distance from a wall, the protection system creates a corresponding network of virtual walls or monitored planes, each spaced apart in a parallel arrangement with a wall. Once this network of monitored planes is created, the protection system uses the same network of sensors to monitor for penetration or intrusion of a monitored plane by an object, e.g. person, aircraft, ground support vehicle, etc. If a monitored plane is penetrated, the system and method activate an aural and visual alarm to signal the tug operator of a potential impact between the object and the physical wall of the facility.

Figure 1A:
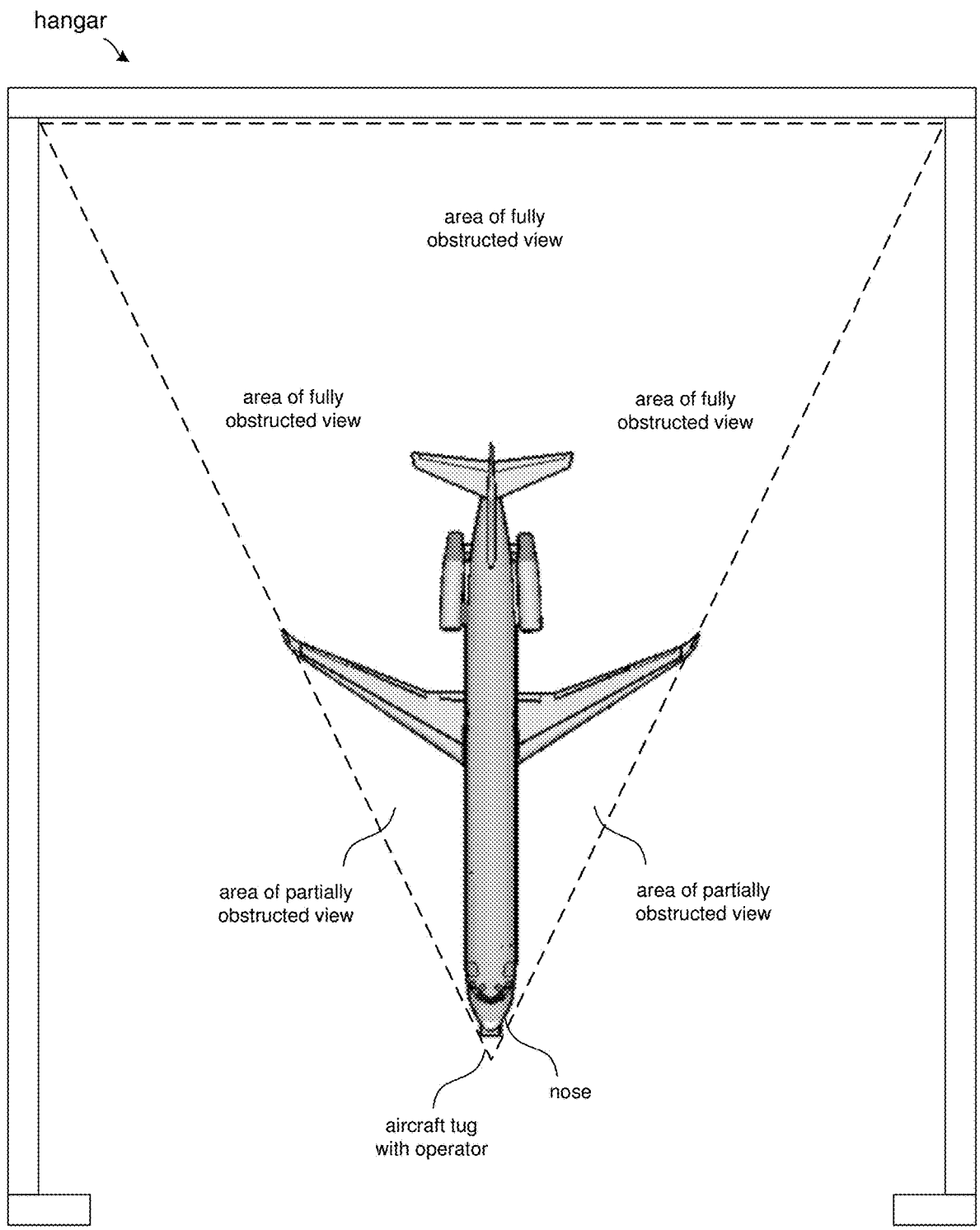
FIG. 1A is a schematic illustration of a hangar with the roof removed to make visible an aircraft positioned in the hangar and areas of partial and full visual obstruction relative to an aircraft tug at the nose of the aircraft.
Figure 1B:
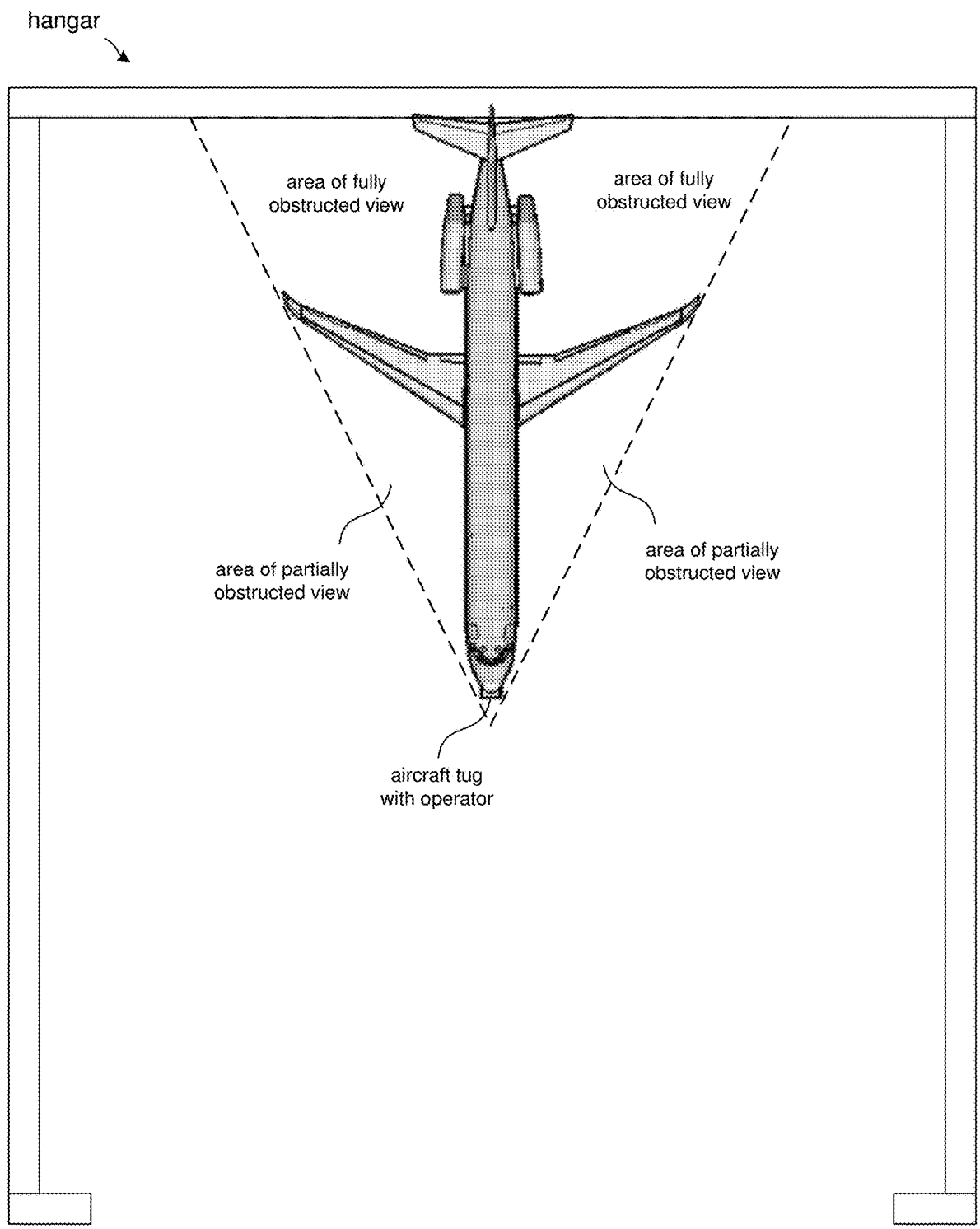
FIG. 1B is a schematic illustration of the hangar of FIG. 1A, wherein the aircraft has been repositioned in a manner that results in an impact between the back surface or wall of the hangar and the tail of the aircraft.
Figure 2:
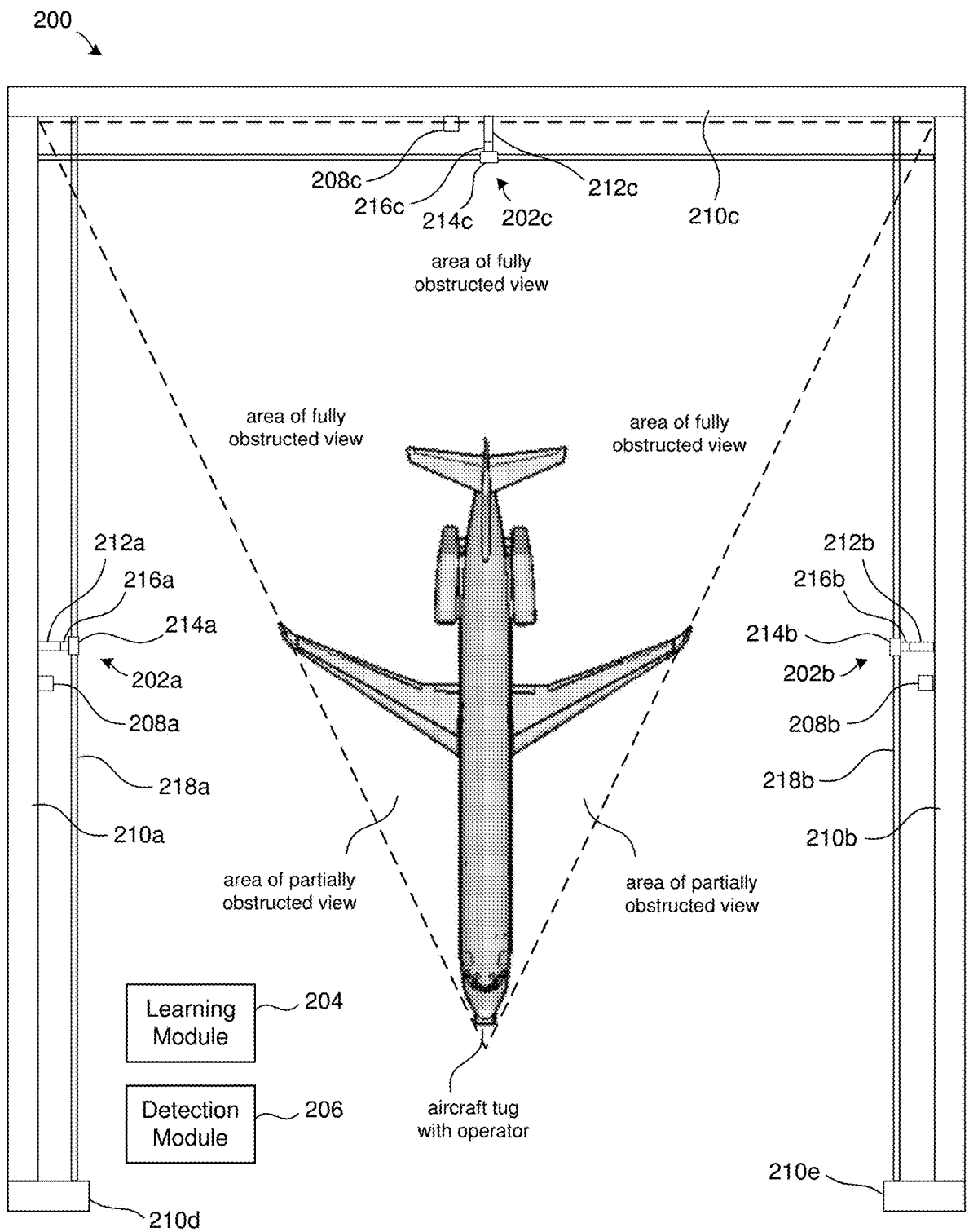
FIG. 2 is a schematic illustration of a hangar with the roof removed to make visible an aircraft positioned in the hangar and a protection system having three veils or monitored planes that create protected areas adjacent physical surfaces of the hangar.
Figure 3:
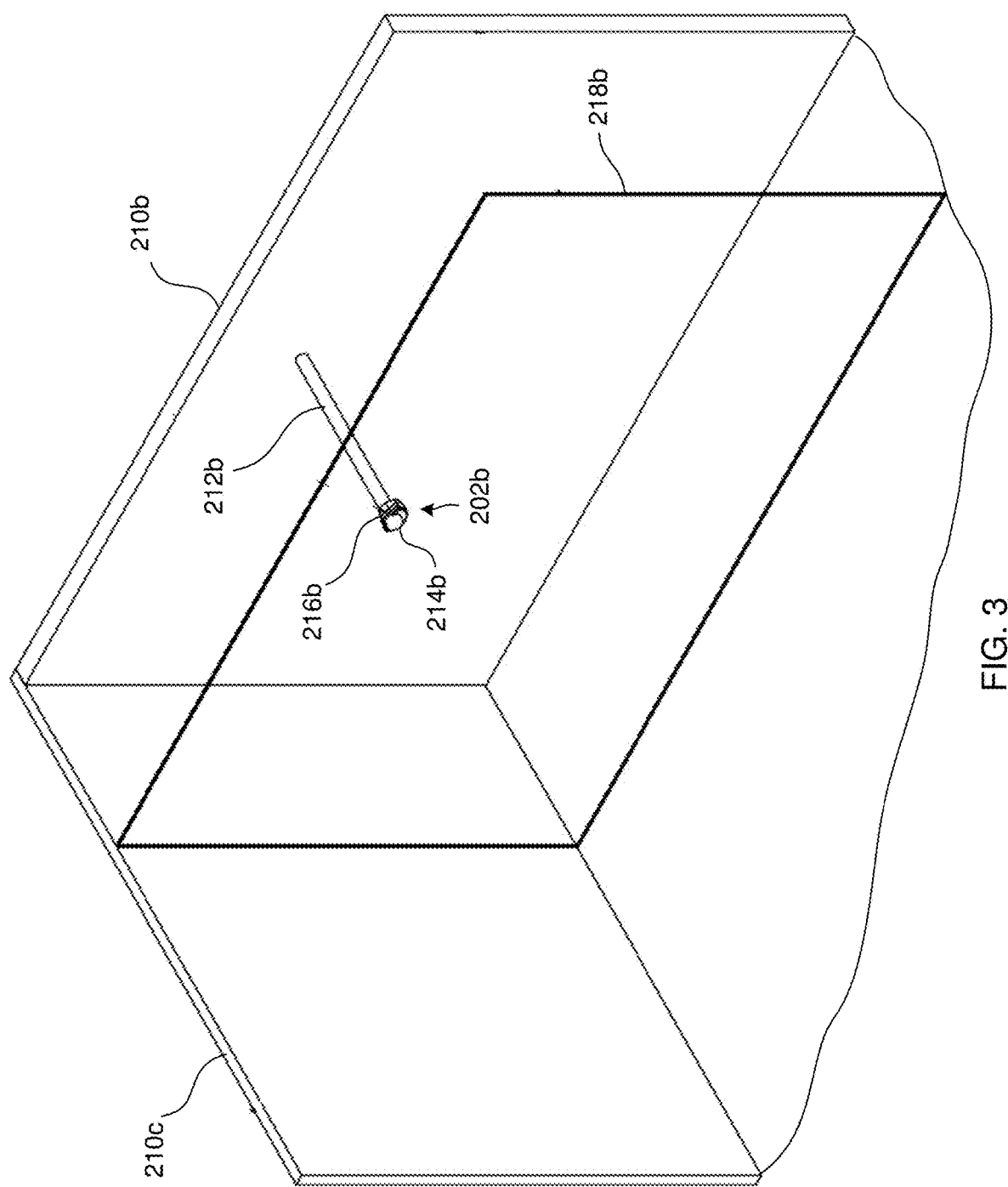
FIG. 3 is an isometric illustration of a monitored plane that creates a protected area adjacent a physical surface.

With reference to FIGS. 2 and 3, an example protection system 200 installed in an aircraft hangar and configured in accordance with the concepts disclosed herein includes three measurement modules 202a, 202b, 202c, a learning module 204, a detection module 206, and three alarm modules 208a, 208b, 208c. While the learning module 204 and detection module 206 are shown separately, they may be embodied in a single controller in the form of a microprocessor programmed to implement the features of the protection system 200 described herein.

The modules of the protection system 200 are communicatively coupled together to allow information and data from the measurement modules 202a, 202b, 202c to reach the learning module 204 and the detection module 206, and to allow control signals from learning module 204 to reach the measurement modules 202a, 202b, 202c, and control signals from the detection module 206 to reach the alarm modules 208a, 208b, 208c. The communication coupling may be wired or wireless.

As shown in FIG. 2, each of the measurement modules 202a, 202b, 202c is associated with a respective physical surface of the hangar. For example, the first measurement module 202a is associated with a first sidewall 210a of the hangar, the second measurement module 202b is associated with a second sidewall 210b of the hangar, and the third measurement module 202c is associated with a backwall 210c of the hangar. The respective associations between the measurement modules 202a, 202b, 202c and the walls 210a, 201b, 210c places the measurement modules in a spaced apart relationship with the wall. To this end, each measurement modules 202a, 202b, 202c may be located on a pole 212a, 212b, 212c or rod that projects outward from the wall 210a, 201b, 210c.

Each of the measurement modules 202a, 202b, 202c includes a sensor 214a, 214b, 214c that is configured to provide distance measurements between itself and objects near the sensor. These objects may be, for example, hangar surfaces including walls, the floor, the ceiling, or other structures within the hangar, such as tables, shelves, a parked ground support vehicle. Each of the measurement modules 202a, 202b, 202c also includes a rotation mechanism 216a, 216b, 216c configured to rotate the sensor 214a, 214b, 214c at a particular rotation rate. To this end, each sensor 214a, 214b, 214c is associated with a motor 216a, 216b, 216c that rotates under the control of the learning module 204 or the detection module 206. Rotation of the motor translates to rotation of the sensor 214a, 214b, 214c at the rotation rate.

Continuing with FIG. 2, each of the alarm modules 208a, 208b, 208c is associated with a respective physical surface of the hangar. For example, the first alarm module 208a is associated with a first sidewall 210a of the hangar, the second alarm module 208b is associated with a second sidewall 210b of the hangar, and the third alarm module 208c is associated with a backwall 210c of the hangar. In an alternative configuration, the alarm modules 208a, 208b, 208c are integrated with a respective measurement modules 202a, 202b, 202c.

With reference to FIGS. 2 and 3, during a learning phase of the protection system 200, each of the sensors 214a, 214b, 214c provides a set of baseline distance measurements to the learning module 204. From each set of baseline measurements, the learning module 204 creates a corresponding monitored plane 218a, 218b, 218c that is spaced apart from a respective surface 210a, 210b, 210c. These monitored planes 218a, 218b, 218c are not physical in nature, but are instead virtual planes, each of which is bound by its adjacent hangar surfaces 210a, 210b, 210c, 210d, 210e, the floor of the hangar and the ceiling of the hangar, and any other structures, e.g., tables, shelves, parked ground support vehicle, that are detected by the sensor. These monitored planes 218a, 218b, 218c are defined by a set of baseline measurements. The distance between each surface 210a, 210b, 210c and its respective monitored plane 218a, 218b, 218c defines a protected area within the hangar. These distances are defined by the length of the pole 212a, 212b, 212c to which the sensors 214a, 214b, 214c are attached. The distance is typically in the range of 2 to 5 feet.

During a detection phase of the protection system 200, subsequent distance measurements are provided to the detection module 206. From these subsequent measurements, the detection module 206 determines if an object has breached or crossed through a monitored plane 218a, 218b, 218c. If a breach or intrusion has occurred, the detection module 206 outputs an activation signal to a corresponding alarm module 208a, 208b, 208c. The alarm module 208a, 208b, 208c may be visual or aural in nature. For example, the alarm module 208a, 208b, 208c may include lights configured to flash and/or speakers configured to output an alarm sound.

Having thus described the configuration and operation of the protection system 200 at a general level, a more detailed description follows.

Figure 4:
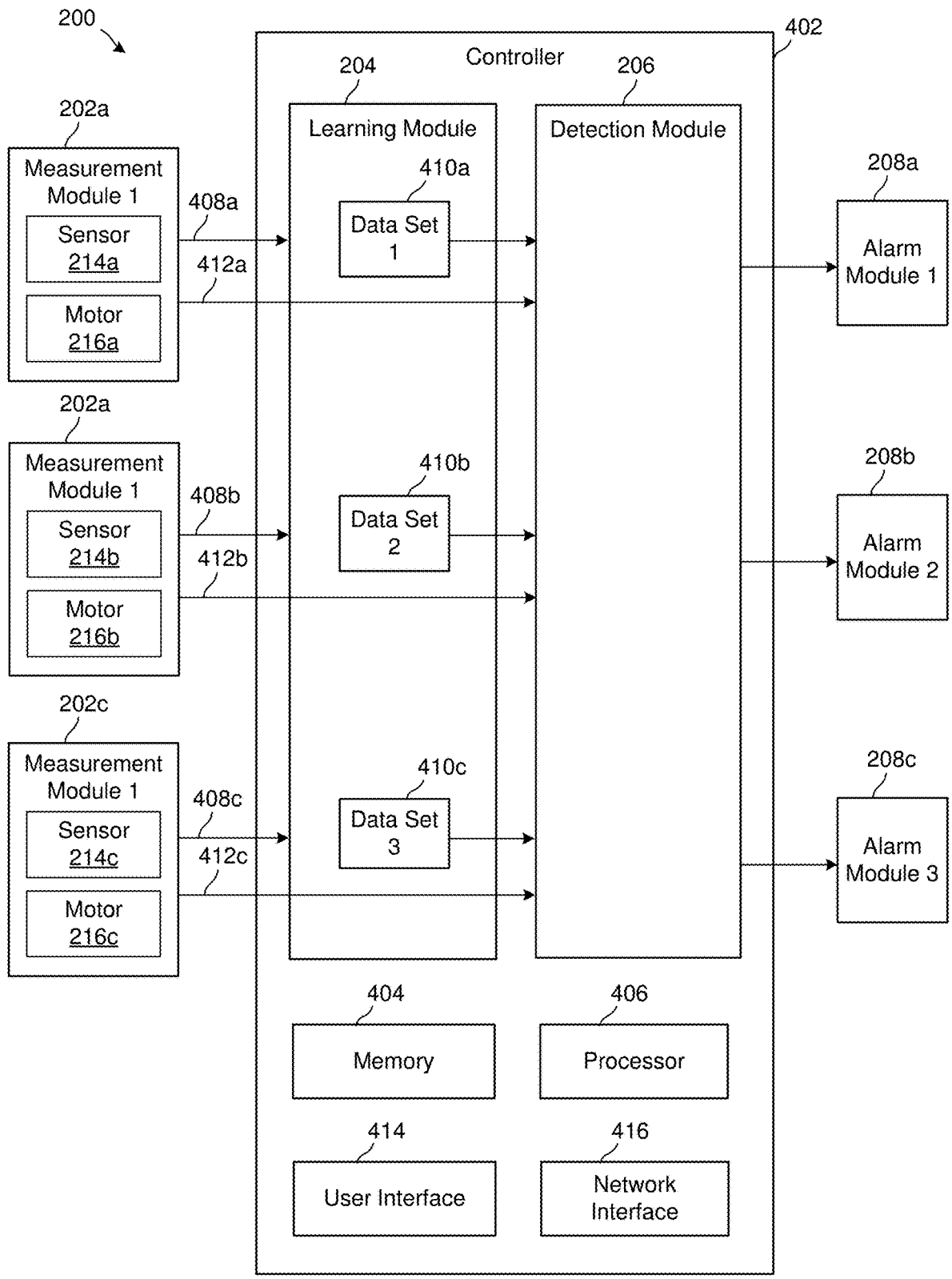
FIG. 4 is block diagram of a protection system including measurement modules, a learning module, a detection module and alarm modules.

With reference to FIG. 4, the protection system 200 includes one or more measurement modules 202a, 202b, 202c, a learning module 204, a detection module 206, and one or more alarm modules 208a, 208b, 208c. The number of measurement modules 202a, 202b, 202c and alarm modules 208a, 208b, 208c corresponds to the number of surfaces of the facility for which protection is sought. Thus, while only three measurement modules 202a, 202b, 202c and alarm modules 208a, 208b, 208c for protecting three surfaces are shown in FIG. 4, more or less modules may be included in a protection system 200. The learning module 204 and the detection module 206 may be embodied in a single controller 402 having a memory 404 and a processor 406 programmed to implement the features of the learning module 204 and the detection module 206 as disclosed herein.

As described above, each of the measurement modules 202a, 202b, 202c includes a sensor 214a, 214b, 214c that is configured to provide distance measurements between itself and objects, e.g., hangar surfaces, ceiling, floor, etc., near the sensor. Each sensor 214a, 214b, 214c in turn, is associated with a motor 216a, 216b, 216c that is configured to rotate at a particular rotation rate in accordance with a control signal output by the controller 402.

In one configuration, the sensor 214a, 214b, 214c is a light detection and ranging (LIDAR) sensor that utilizes a pulsed laser light and time of flight calculations to determine distance measurements. An example LIDAR sensor 214a, 214b, 214c that may be employed by the protection system 200 is a RPLIDAR A3 sensor manufactured by Slamtec. In another configuration, the sensor 214a, 214b, 214c may be a RPLIDAR A2 sensor, also manufactured by Slamtec. In yet another configuration, the sensor 214a, 214b, 214c may be a TG30 LIDAR manufactured by YDLIDAR. In either configuration, the sensor 214a, 214b, 214c is configured to output data 408a, 408b, 408c corresponding to distance measurements at a programmable rate. For example, the sensors 214a, 214b, 214c may be programmed to output distance measurements 408a, 408b, 408c at a rate of one per one-thirty-six-hundredths (1/3600) of a second, which equates to 3600 measurements per second.

The protection system may include one or more visual output devices configured to provide visual cues to locations inside the facility and outside the facility to thereby notify ground personnel of the status of the protection system. The visual output device allows ground personnel to determine if the protection system is up and running, or if it is malfunctioning prior to moving an airplane into or out of the facility. The visual output device includes a light and a controller/detector that controls the light.

In one configuration, the visual output devices may be a component of one or more of the measurement modules 202a, 202b, 202c. In other configurations, the visual output devices may be associated with components of the protection system other than the measurement modules 202a, 202b, 202c, such as the alarm modules 208a, 208b, 208c. Alternatively, the visual output devices may be independent components of the protection system placed at locations both inside and outside the facility that wirelessly communicate with other components of the protection system, such as the sensor 214a, 214b, 214c of the measurement modules 202a, 202b, 202c. In this case, the one or more visual output devices may be located remote from all of the measurement modules 202a, 202b, 202c at a location that is more visible to personnel.

The visual output device may be configured to activate the light in one way, e.g., flash a red light, when the protection system is determined to be malfunctioning, and in another way, e.g., steady green light, when the protection system is determined to be fully functional and up and running. A measurement modules 202a, 202b, 202c of the protection system is determined to be malfunctioning (meaning the system is not working properly) or when the system enters a learning mode (meaning the system is functioning but is not yet ready to enter a detection mode).

The protection system may be determined to be malfunctioning if, for example, a sensor 214a, 214b, 214c of a measurement module 202a, 202b, 202c does not respond to the protection system controller. To this end, each sensor 214a, 214b, 214c may be configured to output a signal in response to a ping from the controller, and the visual output device is configured to receive or detect these signals. In the case of one or more separate visual output devices, each sensor 214a, 214b, 214c of a measurement module 202a, 202b, 202c is configured to communicate wirelessly to the remotely located visual output device. The visual output device waits for an "I'm ok" signal from each sensor 214a, 214b, 214c. When the visual output device receives an "I'm ok" signal from all sensors 214a, 214b, 214c, it may output an indication, e.g., steady green light, that the protection system is ready. If the visual output device does not receive an "I'm ok" signal from all sensors 214a, 214b, 214c, it may output an indication, e.g., flashing red light, that the protection system is not ready.

The protection system may also be determined to be malfunctioning if the system fails to complete the learning mode (performed by the learning module 204 as described below) and thus fails to enter the detection mode (performed by the detection module 206 as described below). To this end, the system controller may be configured to output a signal corresponding to the state of the learning mode, and the visual output device is configured to receive or detect this signal and respond accordingly. For example, in the case of a failure to complete the learning mode, the visual output device may output an indication, e.g., flashing red light, that the protection system is not up and running. In the case of a successful completion of the learning mode, the visual output device may output an indication, e.g., steady green light, that the protection system is up and running.

The learning module 204 receives distance measurements 408a, 408b, 408c from each of measurement modules 202a, 202b, 202c and creates a monitored plane based on these measurements. As noted above, the monitored planes 218a, 218b, 218c shown in FIGS. 2 and 3 are not physical in nature, but instead are virtual planes, each having a perimeter defined by a set of distance measurements 408a, 408b, 408c received from a measurement module 202a, 202b, 202c and a corresponding set of angle parameters that are assigned by the learning module 204. Thus, the monitored planes 218a, 218b, 218c created by the learning module 204 are structured as data sets 410a, 410b, 410c, where each instance or data point in the data set is defined by a distance measurement 408a, 408b, 408c and an angular measurement. These data sets 410a, 410b, 410c may be stored in the memory 404 of the controller 402.

To determine the data points in these data sets 410a, 410b, 410c, the learning module 204 is configured to control rotation of the motor 216a, 216b, 216c of each respective measurement module 202a, 202b, 202c so its associated sensor rotates at a set rate. For example, the learning module 204 may be programmed to output a control signal to each motor 216a, 216b, 216c that causes the motor and it associated sensor 214a, 214b, 214c to rotate once, or 360 degrees, per second. Thus, rotating at a rate of 360 degrees per second and providing distance measurements 408a, 408b, 408c at a rate of 3600 per second, the measurement modules 202a, 202b, 202c provide 3600 distance measurements for each 360 degree rotation of the sensor. In other words, the measurement modules 202a, 202b, 202c provide a distance measurement 408a, 408b, 408c every one-tenth of a degree of rotation.

Figure 5:
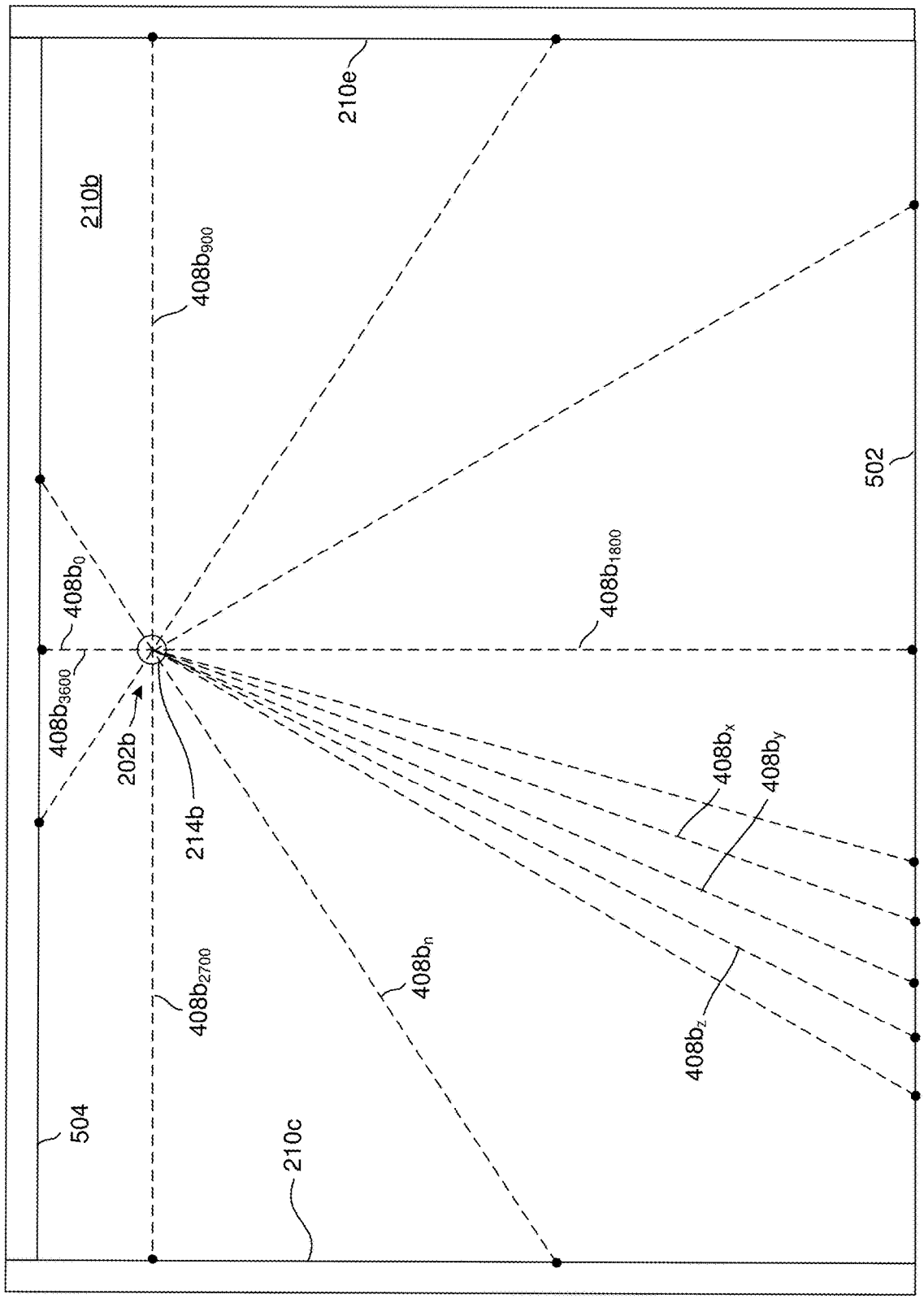
FIG. 5 is a plan view of a monitored plane relative to a pair of physical side surfaces, a floor and a ceiling, and showing a number of baseline measurements that define the monitored plane.

Acquisition of a set of distance measurements for one physical surface is described further with reference to FIG. 5, which illustrates distance measurements $408b_n$ obtained by the measurement module 202b and sensor 214b associated with the surface 210b. While a large number, e.g., 3600, of such distance measurements per revolution may be obtained, for ease of illustration, a limited number of distances are shown in FIG. 5. Each of the distance measurements $408b_n$ corresponds to distance between the sensor 214b and an object in the line of sight of the laser pulse beam output by the sensor. These objects in the line of sight may be, for example, a backwall 210c adjacent to the surface 210b, a floor 502, a ceiling 504, or a front wall 210e.

Assuming the sensor 214b is directed to output its first laser pulse beam at 0 degrees that aligns with 12 o'clock, and rotates one revolution per second clockwise or 360 degrees back to 12 o'clock outputting a laser pulse beam every one-thirty-six-hundredths (1/3600) of a second, the sensor will provide a first distance measurement $408b_0$ at 12 o'clock, a $900^{th}$ distance measurement $408b_{900}$ 0.25 seconds later at 3 o'clock, a $1800^{th}$ distance measurement $408b_{1800}$ 0.5 seconds later at 6 o'clock, a $2700^{th}$ distance measurement $408b_{2700}$ 0.75 seconds later at 9 o'clock and a $3600^{th}$ distance measurement $408b_{3600}$ 1 seconds later at 12 o'clock.

Associated with each of these 3600 distance measurements is an angle parameter that identifies the angle at which the distance measurement was obtained. For example, continuing with the example of FIG. 5, the parameter associated with the first distance measurement $408b_0$ may be 0 degrees, the parameter associated with the $900^{th}$ distance measurement $408b_{900}$ may be 90 degrees, the parameter associated with the $1800^{th}$ distance measurement $408b_{1800}$ may be 180 degrees, the parameter associated with the $2700^{th}$ distance measurement $408b_{2700}$ may be 270 degrees, and the parameter associated with the $3600^{th}$ distance measurement $408b_{3600}$ may be 360 degrees.

The learning module 204 receives distance measurements 408b from the measurement module 202b over a period of time or for a number of rotations of the sensor 214b, until a valid data set for the monitored plane 218b is obtained. To this end, the learning module 204 may collect a set of distance measurements 408b for each angular measurement or angle parameter and then apply a selection criterion or statistical analysis to each set of distance measurements to derive a valid data point for each angular measurement.

In one configuration, the learning module 204 derives a valid data point for each angle by selecting the nearest or shortest distance measurement 408b from the set of distance measurements obtained for that angle, as the valid distance measurement for that angle. For example, if a set of five distance measurements 408b are obtained for each angle by five rotations of the sensor 214b, the learning module 204 compares the five distance measurements associated with each particular angle and selects the shortest distance as the valid distance measurement for that particular angle.

In another configuration, the learning module 204 derives a valid data point for each angle by averaging the distance measurements 408b included in the set of distance measurements obtained for that angle. For example, if a set of five distance measurements 408b are obtained for each angle by five rotations of the sensor 214b, the learning module 204 calculates the average of the five distance measurements associated with each particular angle and defines the average as the valid distance measurement for that particular angle.

In the example of FIG. 5, the resulting data set 410b comprises 3600 instances or data points, each defined by a distance measurement and an angle parameter. The data sets 410a, 410c for other physical surfaces 210a, 210c are acquired in the same way. Portions of an example data set are provided in Table 1.

TABLE 1

| Angle parameter (degree of rotation) | Distance measurement (millimeters) |
|---|---|
| 90.0 | 5719 |
| 90.1 | 5719 |
| 90.2 | 5722 |
| 90.3 | 5737 |
| 90.4 | 5761 |
| 90.5 | 5783 |
| 90.6 | 5789 |
| 90.7 | 5796 |
| 90.8 | 5802 |
| 90.9 | 5805 |
| ⋮ | ⋮ |
| 359.0 | 3729 |
| 359.1 | 3694 |
| 359.2 | 3684 |
| 359.3 | 3684 |
| 359.4 | 3676 |
| 359.5 | 3669 |
| 359.6 | 3671 |
| 359.7 | 3664 |
| 359.8 | 3669 |
| 359.9 | 3661 |

It is noted that the shape, material, and reflectivity properties of the physical surfaces, and the relative angle between the physical surfaces and the sensor 214b laser beam may impact the ability of the sensor to obtain distance measurements 408b at certain angles. As a result, valid distance measurements may not be obtainable at every angle in a data set 410b.

To address this scenario, the learning module 204 may be programmed to determine a data set 410b is valid when the learning module has obtained valid distance measurements 408b for a percentage of the total number of possible data points. For example, the learning module 204 may declare a data set 410b valid when the number of data points learned is between 85% and 95% of the total number of possible data points. In the case of 3600 data points and a 90% threshold, the learning module declares a data set valid when the module has learned 3240 data points.

To further address the scenario where valid distance measurements are not obtainable at every angle in a data set 410b, the learning module 204 may be configured to derive these unobtainable distance measurements based on valid distance measurements included in the data set 410b. To this end, the learning module 204 may derive an unobtainable distance measurement for a particular angle by locating valid distance measurements in the data set on either side of the particular angle and calculating the average of these measurements. For example, with reference to Table 1, assuming the distance measurement for angle 359.5 was unobtainable, the learning module 204 may locate the distance measurements for angles 359.4 and 359.6, calculate the average, and insert that average into the data set 410b as the distance measurement for angle 359.5.

Once the data sets 410a, 410b, 410c are established, the detection module 206 begins to receive subsequent measurements 412a, 412b, 412c from each of measurement modules 202a, 202b, 202c and evaluates the subsequent measurements relative to the baseline measurements. To this end, the detection module 206 is configured to control rotation of the motor 216a, 216b, 216c of each respective measurement module 202a, 202b, 202c so its associated sensor rotates at a set rate corresponding to the same rate used to collect the baseline measurements. For example, the detection module 206 may be programmed to output a control signal to each motor 216a, 216b, 216c that causes the motor and it associated sensor 214a, 214b, 214c to rotate 360 degrees per second. Thus, rotating at a rate of 360 degrees per second and providing distance measurements 412a, 412b, 412c at a rate of 3600 per second, the measurement modules 202a, 202b, 202c provide 3600 distance measurements for each 360 degree rotation of the sensor. In other words, the measurement modules 202a, 202b, 202c provide a distance measurement 412a, 412b, 412c every one-tenth of a degree of rotation.

Figure 6:
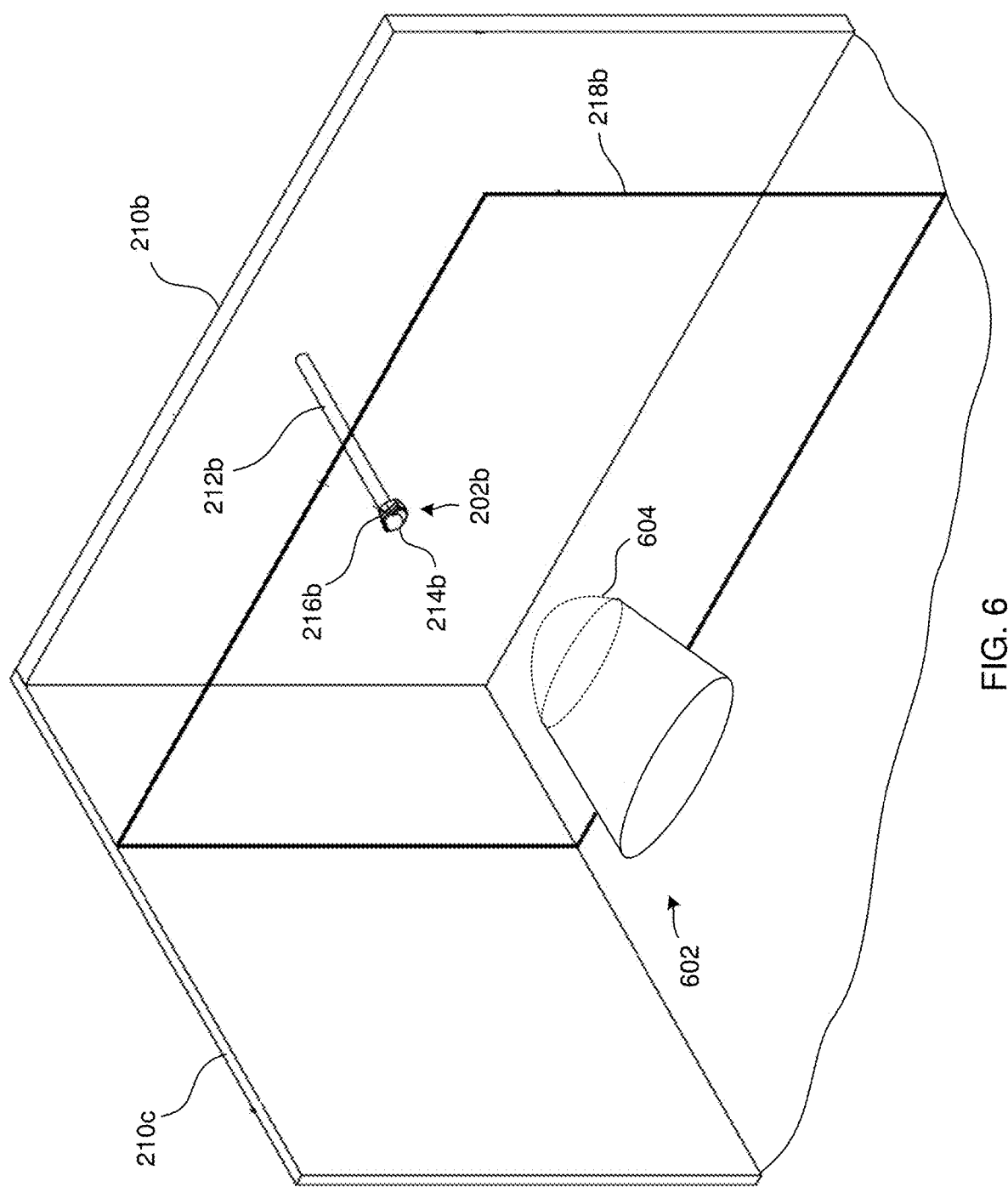
FIG. 6 is an isometric illustration of the monitored plane of FIG. 3 breached by an object.

For each surface 210a, 210b, 210c protected by a monitored plane 218a, 218b, 218c, the detection module 206 may evaluate subsequent measurements 412a, 412b, 412c provided by the measurement module 202a, 202b, 202c associated with that surface relative to its baseline measurements 408a, 408b, 408c to determine if an object has penetrated or intruded the monitored plane. With reference to FIG. 6, an object 602 is considered to breach or intrude a monitored plane 218b when a part 604 or portion of it pass through the plane. The object 602 may be, for example, a tip of an aircraft wing. The detection module 206 detects such intrusions by comparing, in real time, one or more subsequent measurements 412a, 412b, 412c to corresponding baseline measurements 408a, 408b, 408c to determine an intrusion state for each monitored plane.

Figure 7:
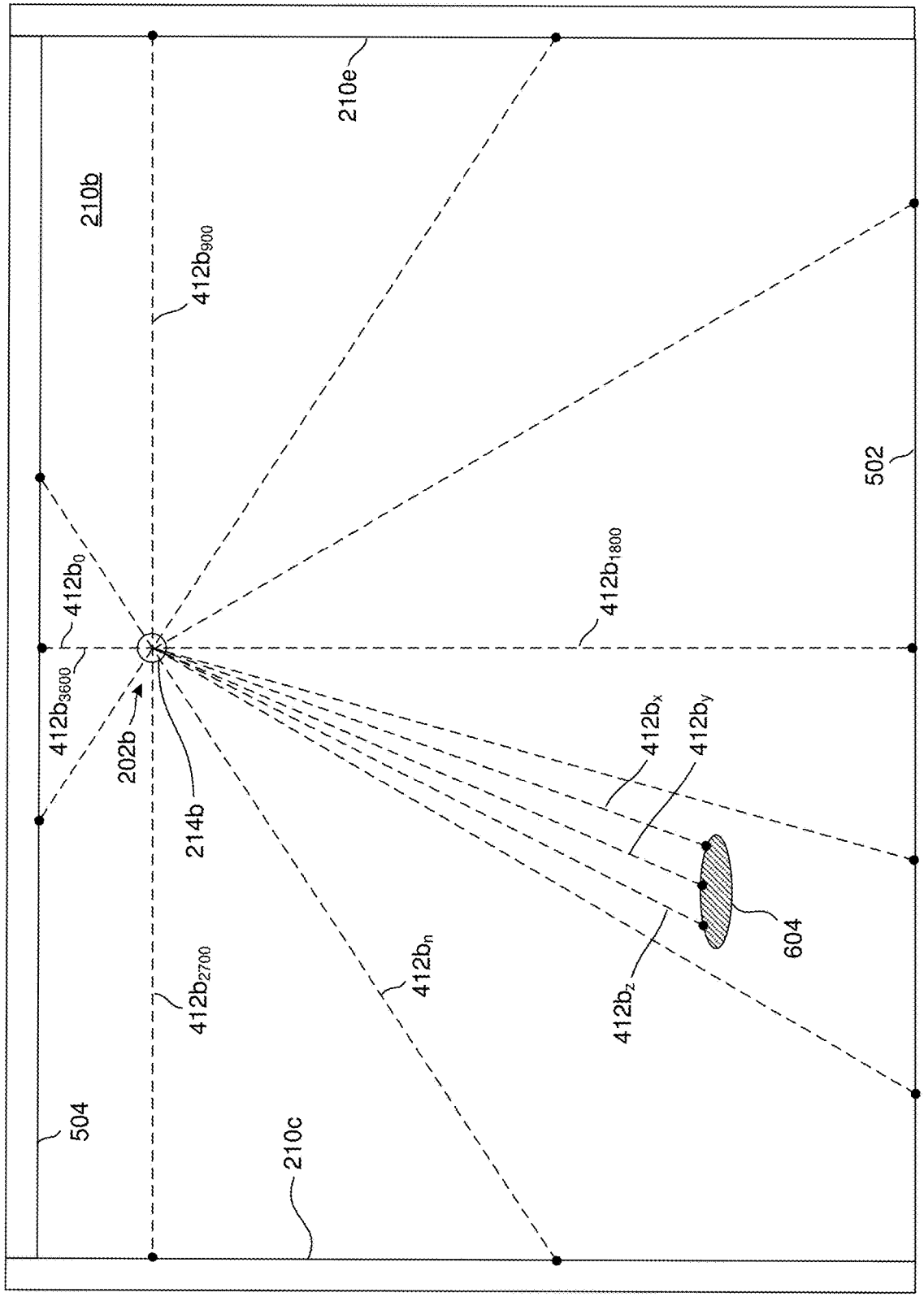
FIG. 7 is a plan view of a monitored plane and a cross-section of an object breaching the monitored plane, and showing a number of subsequent measurements that indicate an intrusion of the monitored plane.

Acquisition of subsequent measurements for one physical surface is described further with reference to FIG. 7, which illustrates subsequent distance measurements $412b_n$ obtained by the measurement module 202b and sensor 214b associated with the surface 210b. While a large number, e.g., 3600, of such distance measurements $412b_n$ per revolution may be obtained, for ease of illustration, a limited number of distances are shown in FIG. 7. Each of the distance measurements $412b_n$ corresponds to a distance between the sensor 214b and an object in the line of sight of the laser pulse beam output by the sensor. Under normal conditions, these objects in the line of sight would be the same objects that were present while the baseline measurements were obtained. Such objects include, for example, a backwall 210c adjacent to the surface 210b, a floor 502, a ceiling 504, or a front wall 210e. In FIG. 7, however, a part 604 of an object that was not present during baseline measuring is in the line of sight of a set of three laser pulse beams output by the sensor 214b. This causes the subsequent measurements $412b_x$, $412b_y$, $412b_z$ to be different in value from their corresponding baseline measurements $408b_x$, $408b_y$, $408b_z$ shown in FIG. 5. Based on these differences in measurements the detection module 206 may conclude that an intrusion of the monitored plane 218b has occurred.

In one configuration, the detection module 206 may conclude that an intrusion of a monitored plane 218a, 218b, 218c occurred when any one of the subsequent measurements $412b_x$, $412b_y$, $412b_z$ is less than a value that is based on its corresponding baseline measurement $408b_x$, $408b_y$, $408b_z$. In one embodiment the value is equal to the corresponding baseline measurement itself. In this case, an intrusion is concluded to occur when a subsequent measurements $412b_x$, $412b_y$, $412b_z$ is less than its corresponding baseline measurement $408b_x$, $408b_y$, $408b_z$. In another embodiment, the value is equal to the corresponding baseline measurement plus a buffer measurement. For example, the buffer measurement may be 5 millimeters. Thus, in this case, an intrusion is concluded to occur when a subsequent measurements $412b_x$, $412b_y$, $412b_z$ is less than its corresponding baseline measurement $408b_x$, $408b_y$, $408b_z$ plus 5 millimeters.

In another configuration, in order to reduce false alarms, the detection module 206 may conclude that an intrusion of a monitored plane 218a, 218b, 218c occurred when a same subsequent measurement $412b_x$, $412b_y$, $412b_z$ is less than the value that is based on its corresponding baseline measurement $408b_x$, $408b_y$, $408b_z$ for a set number of consecutive measurements or over a period of time. For example, assuming a particular subsequent measurement $412b_x$ is obtained once every second, then an intrusion state may be considered present when three consecutive instances of that particular subsequent measurement $412b_x$ are less than the value that is based on its corresponding baseline measurement $408b_x$.

In yet another configuration, in order to reduce false alarms, the detection module 206 may conclude that an intrusion of a monitored plane occurred when a threshold number of subsequent measurements 412b, in a set of adjacent subsequent measurements agree that an intrusion occurred. To this end, when the detection module 206 determines that a first subsequent measurement $412b_x$ indicates an intrusion, i.e., the subsequent measurement is less than the value based on its corresponding baseline measurement, the detection module determines if one or more other subsequent measurements $412b_y$, $412b_z$ adjacent to the first subsequent measurement also indicate an intrusion. For example, the detection module 206 may evaluate five subsequent measurements 412b adjacent to the first subsequent measurement $412b_x$ and conclude that a detection occurred when at least three of the five subsequent measurements 412b also indicated an intrusion. In this case, adjacent subsequent measurements 412b are measurements that are obtained one after the other, at different angles, after the first subsequent measurement $412b_x$ that first indicated the intrusion.

Figure 8:
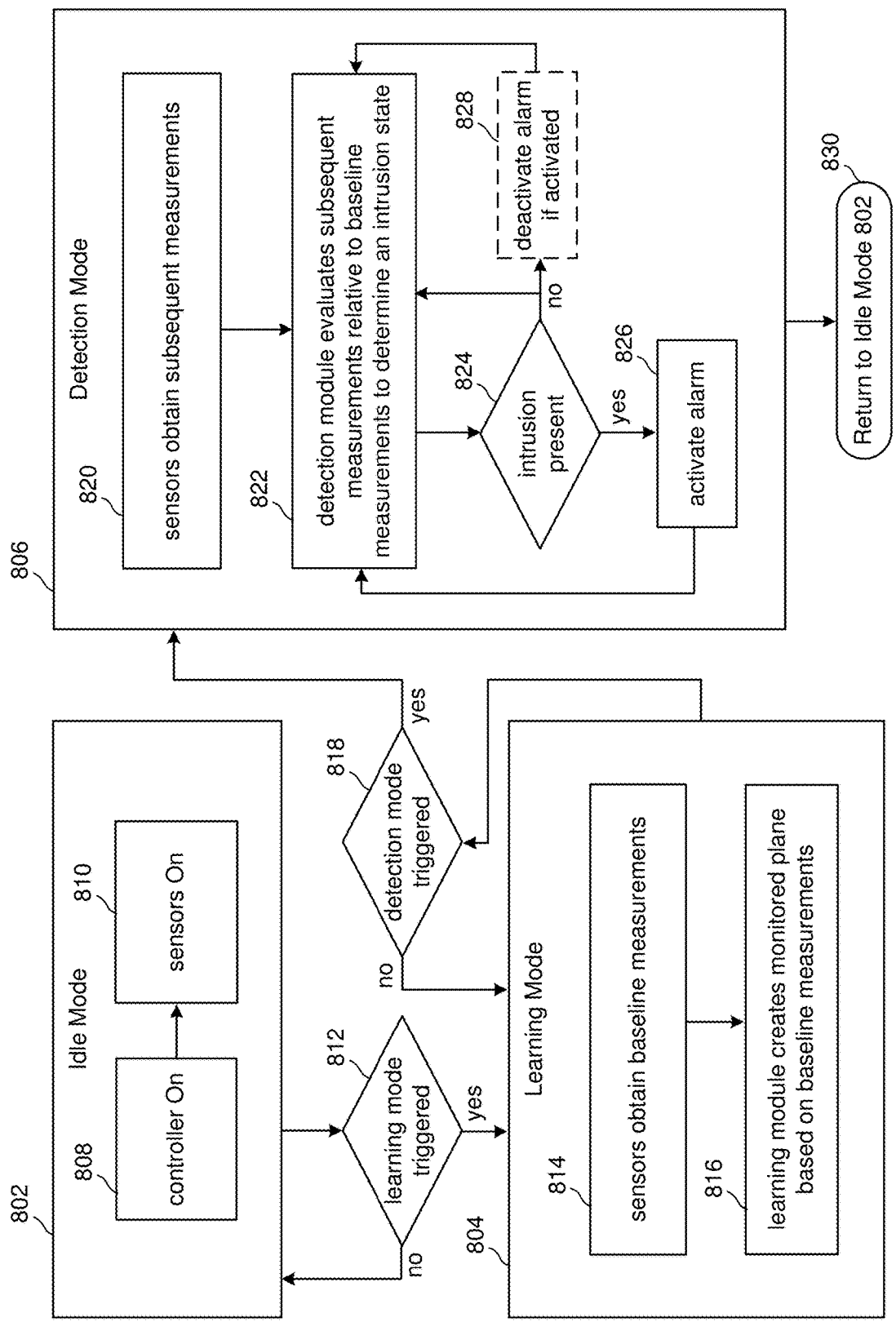
FIG. 8 is a flowchart of operation of the protection system of FIG. 4.

FIG. 8 is a flowchart of a method of protecting against impact between a moving vehicle and a facility for housing the vehicle. The method may be performed by the protection system of FIG. 4. The method comprises three general sets of steps, each corresponding to an operation mode or state of the protection system 200. These modes include an idle mode 802, a learning mode 804, and a detection mode 806.

In the idle mode 802, the system's controller 402 is powered on, but is typically not collecting or processing any data. The controller 402 is simply waiting for an input trigger to enter into another mode. An input trigger may result from operator activation of an operational switch or graphical user interface button on the controller. In other configurations, less reliant on operator input, an input trigger may automatically result from a detection of movement or motion within the facility by a motion sensor. In one configuration, a sensor mounted on a vehicle tug is wirelessly paired with a sensor associated with the facility, e.g., on a wall of the facility. When the tug is powered on, the tug sensor is activated. When the tug and its associated tug sensor move within range of the facility sensor, the facility sensor automatically causes the controller 402 to enter the learning mode, followed by the detection mode. When the tug and its associated sensor move out of range of the facility sensor, or when the tug and its associated sensor are powered off, the facility sensor outputs a signal that automatically causes the controller 402 to return to the idle mode. This return to the idle mode may occur a pre-determined period of time after the tug and its associated sensor move out of range of the facility sensor, or after the tug and its associated sensor are powered off. This automatic feature allows for the protection system to be in idle mode when it is not needed, thereby reducing false detections. It also helps to eliminate operator error in that no operational switch is required to be turned on by an operator for the protection system to work.

In the learning mode 804, the system's sensors rotate about a plane of rotation to obtain data points corresponding to distances between the sensor and walls, ceilings, floors, and any other object in the plane. The protection system 200 may be configured to enter the learning mode 804 upon the occurrence of an input trigger as described above. In one configuration, the protection system 200 remains in the learning mode 804 until it has learned a pre-determined and pre-programed percentage of data points, where each data point is defined by an angle parameter and a distance measurement. The learning mode 804 results in a baseline data set of data points to compare with subsequent data points compiled during the detection mode 806. The protection system 200 may automatically switch to the detection mode 806 from learning mode 804 when it has compiled the required amount of data points in the learning mode.

As noted above, the shape, material, and reflectivity properties of the physical surfaces that the sensor is detecting, and the relative angle between these surfaces and the senor laser beam, all play a role in how long (or how many rotational sweeps of the sensor) it takes to build a valid baseline set of data points. Since the protection system 200 is utilizing measurements at 0.1 degree increments, there are a lot of data points to compile. The sensor may not be able to learn 100% of the data in a reasonable amount of time. In some cases, distance measurements at certain degrees may not be detected by the sensor at all due to shape, material, angle and reflectivity properties of the surfaces. Therefore, the protection system 200 may be programmed to enter the detection mode 806 when it has learned a percentage of the total number of possible data points. For example, the protection system 200 may enter the detection mode 806 when the number of data points learned is between 85% and 95% of the total number of possible data points. In the case of 3600 data points and a 90% threshold, the protection system 200 enters the detection mode 806 when the system has learned 3240 data points.

Regarding missing data points, while in the detection mode 806, the protection system 200 may continue to attempt to learn these data points and add them to the baseline set of data points as they are learned. Accordingly, the sensors may continue to detect for distance measurements for the missing data points. Alternatively, the protection system 200 may derive the missing data points based on current data points adjacent to the missing data point. For example, a missing distance measurement for an angle may be derived by calculating the average of one or more distance measurements on one or both sides of the angle.

In the detection mode 806, the system's sensors obtain subsequent distance measurements and compares them to corresponding baseline distance measurements used to compile the baseline data points in learning mode 804. The controller 402 looks for any distance that is closer to the sensor than that which was recorded in the learning mode. If a new object enters the sensor's plane of rotation, the controller 402 detects that the subsequent distance at an angle is closer than the corresponding baseline distance at the same angle. The system's controller 402 may then send a signal for the attached alarms to activate, thus letting the tug operator know of a new intrusion into the plane.

Having generally described the three modes of operation, a more detailed description follows, wherein operation of the protection system 200 is within the context of a moving vehicle corresponding to an aircraft under tow and a facility corresponding to an aircraft hangar. The protection system 200, however, may operate in any other environments involving moving vehicles and related housing or storage facilities.

Continuing with FIG. 8, in the idle mode 802, at block 808 the controller 402 of the protection system 200 enters a power on state. This may occur through user operation, e.g., manually activating a power switch or button on a user interface 414, or automatically in accordance with a schedule or occurrence of an event, e.g. turn on at a particular time of day or when a door of the hangar opens.

At block 810, upon being turned on, the controller 402 activates each of its associated measurement modules 202a, 202b, 202c. To this end, the controller 402 sends a control signal to each of the sensors 214a, 214b, 214c and the motors 216a, 216b, 216c causing each to turned on. At this time, the sensors 214a, 214b, 214c begin to output laser pulses and the motors 216a, 216b, 216c begin to rotate the sensors.

At block 812, the controller 402 detects for a learning mode trigger. A learning mode trigger may correspond to a user operation, e.g., manually activating a learning switch or on-screen button on the user interface 414, or an occurrence of an event, e.g. turn on of the controller 402 or detection of movement or motion within the hangar. If a learning mode trigger is detected at block 812, the protection system 200 enters the learning mode 804; otherwise the protection system remains in the idle mode 802.

While in the learning mode 804, the protection system 200 creates one or more monitored planes 218a, 218b, 218c each relative to a physical surface 210a, 210b, 210c of the hangar. To this end, at block 814, each sensor 214a, 214b, 214c obtains baseline measurements 408a, 408b, 408c while rotating about an axis perpendicular to its respective physical surface at a rotation rate. The physical surfaces 210a, 210b, 210c may be walls of the hangar. As described above with reference to FIGS. 4 and 5, each of these baseline measurements 408a, 408b, 408c corresponds to a distance between the sensor 214a, 214b, 214c and an object impeding a beam transmitted by the sensor. These measurements 408a, 408b, 408c may be obtained every n degrees of rotation.

As also described above with reference to FIGS. 4 and 5, an object impeding a beam transmitted by a sensor 214a, 214b, 214c may be another structure of the facility, such as a second physical surface adjacent the first physical surface, a floor adjacent the first physical surface, or a ceiling adjacent the first physical surface. The object, however, is not necessarily a structure of the facility and may be, for example, a table, a cart, a shelf, etc. As also described above with reference to FIGS. 2 and 3, the sensor 214a, 214b, 214c is spaced apart from its respective physical surface such that the sensor beams travels along a path that does not impact its respective physical surface. For example, the sensor may be positioned relative to the physical surface so that the beam path is generally parallel to the first physical surface.

Returning to FIG. 8, the measurement modules 202a, 202b, 202c provides the baseline measurements to the learning module 204. At block 816, the learning module 204 creates a corresponding monitored plane 218a, 218b, 218c based on each set of baseline measurements. As described above with reference to FIG. 5, each monitored plane 218a, 218b, 218c is defined by a data set 410a, 410b, 410c that comprises instances of data points, where each data point includes one of the plurality of baseline measurements 408a, 408b, 408c and its corresponding angle parameter. These data set 410a, 410b, 410c basically define the perimeter of the monitored planes 218a, 218b, 218c.

At block 818, the controller 402 detects for a detection mode trigger. A detection mode trigger may correspond to a user operation, e.g., manually activating a detection switch or on-screen button on the user interface 414, or an occurrence of an event, e.g. completion of the learning mode 804. If a detection mode trigger is detected, the protection system 200 enters the detection mode 806.

While in the detection mode 806, the protection system 200 obtains subsequent measurements of the plurality of baseline measurements. To this end, at block 820, each sensor 214a, 214b, 214c obtains subsequent measurements 412a, 412b, 412c, while rotating about an axis perpendicular to the first physical surface at a rotation rate. As described above with reference to FIGS. 4 and 7, each of these subsequent measurements 412a, 412b, 412c corresponds to a distance between the sensor 214a, 214b, 214c and an object impeding a beam transmitted by the sensor. These measurements are obtained every n degrees of rotation.

At block 822, the detection module 206, evaluates one or more subsequent measurements 412a, 412b, 412c relative to corresponding one or more baseline measurements 408a, 408b, 408c to determine if a criterion indicative of an intrusion of a monitored plane 218a, 218b, 218c is satisfied. For example, the criterion may be satisfied when each of the one or more subsequent measurements 412a, 412b, 412c is less than a value that is based on its corresponding baseline measurement 408a, 408b, 408c. This value may be equal to one of the corresponding baseline measurement itself, or the corresponding baseline measurement plus a buffer measurement. Furthermore, the one or more subsequent measurements comprises a plurality of subsequent measurements that are obtained in sequence.

At block 824, if an intrusion is not present, the process returns to block 822 where the detection module 206 continues to evaluate one or more subsequent measurements 412a, 412b, 412c relative to corresponding one or more baseline measurements 408a, 408b, 408c to determine if the criterion indicative of an intrusion of a monitored plane 218a, 218b, 218c is satisfied. If, however, an intrusion state is present at block 824, the process proceeds to block 826, where the detection module 206 activates an alarm. To this end, the detection module 206 outputs a control signal to the alarm module 208a, 208b, 208c associated with the monitored plane 218a, 218b, 218c that was breached to activate the alarm.

Upon activation of an alarm module 208a, 208b, 208c, the process returns to block 822, where the detection module 206 continues to evaluate one or more subsequent measurements 412a, 412b, 412c relative to corresponding one or more baseline measurements 408a, 408b, 408c to determine if the criterion indicative of an intrusion of a monitored plane 218a, 218b, 218c is satisfied. To this end, the detection module 206 monitors the existing breach to determine if the breach persists, while also monitoring for new breaches. Regarding the existing breach, if current subsequent measurements 412a, 412b, 412c cause the detection module 206 to determine that the intrusion criterion is no longer satisfied, the process proceeds to block 828, where the previously activated alarm is deactivated.

At block 830, protection system 200 may return to the idle mode 802 upon a user operation, e.g., manually activating an idle switch or on-screen button on the user interface 414, or an occurrence of an event, e.g. after a pre-determined period of time or after output of a control signal by a facility sensor. For example, as described above, when a tug and its associated sensor move out of range of a facility sensor, or when a tug and its associated sensor are powered off, the facility sensor outputs a signal that automatically causes the controller 402 to return to the idle mode.

Returning to FIG. 4, the controller 402 of the protection system 200 may include one or more processors 406 configured to access and execute computer-executable instructions stored in at least one memory 404. The processor 406 may be implemented as appropriate in hardware, software, firmware, or combinations thereof. Software or firmware implementations of the processor 406 may include computer-executable or machine-executable instructions written in any suitable programming language to perform the various functions described herein. The processor 406 may include, without limitation, a central processing unit (CPU), a digital signal processor (DSP), a reduced instruction set computer (RISC) processor, a complex instruction set computer (CISC) processor, a microprocessor, a microcontroller, a field programmable gate array (FPGA), a System-on-a-Chip (SOC), or any combination thereof. The controller 402 may also include a chipset (not shown) for controlling communications between the processor 406 and one or more of the other components of the controller. The processor 406 may also include one or more application-specific integrated circuits (ASICs) or application-specific standard products (ASSPs) for handling specific data processing functions or tasks.

The memory 404 may include, but is not limited to, random access memory (RAM), flash RAM, magnetic media storage, optical media storage, and so forth. The memory 404 may include volatile memory configured to store information when supplied with power and/or nonvolatile memory configured to store information even when not supplied with power. The memory 404 may store various program modules, application programs, and so forth that may include computer-executable instructions that upon execution by the processor 406 may cause various operations to be performed. The memory 404 may further store a variety of data manipulated and/or generated during execution of computer-executable instructions by the processor 406.

The controller 402 may further include one or more network interfaces 416 that may facilitate communication between the controller and one or more measurement modules 202*a*, 202*b*, 202*c* and one or more alarm modules 208*s*, 208*b*, 208*c* using any suitable communications standard. For example, a LAN interface may implement protocols and/or algorithms that comply with various communication standards of the Institute of Electrical and Electronics Engineers (IEEE), such as IEEE 802.11, while a cellular network interface implement protocols and/or algorithms that comply with various communication standards of the Third Generation Partnership Project (3GPP) and 3GPP2, such as 3G and 4G (Long Term Evolution), and of the Next Generation Mobile Networks (NGMN) Alliance, such as 5G.

The memory 404 may store various program modules, application programs, and so forth that may include computer-executable instructions that upon execution by the processor 406 may cause various operations to be performed. For example, the memory 404 may include an operating system module (O/S) that may be configured to manage hardware resources such as the network interface 416 and provide various services to applications executing on the controller 402.

The memory 404 stores additional program modules such as the learning module 204 and the detection module 206, each of which includes functions in the form of logic and rules that respectively support and enable the learning and detection functions described above with reference to FIGS. 2-8. Although illustrated as separate modules in FIG. 4, one or more of the modules may be a part of or a submodule of another module.

The controller 402 and modules 204, 206 disclosed herein may be implemented in hardware or software that is executed on a hardware platform. The hardware or hardware platform may be a general purpose processor, a digital signal processor (DSP), an application specific integrated circuit (ASIC), a field programmable gate array (FPGA) or other programmable logic component, discrete gate or transistor logic, discrete hardware components, or any combination thereof, or any other suitable component designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP, or any other such configuration.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, a smart card, a flash memory device (e.g., card, stick, key drive), random access memory (RAM), read only memory (ROM), programmable ROM (PROM), erasable PROM (EPROM), electrically erasable PROM (EEPROM), a general register, or any other suitable non-transitory medium for storing software.

Disclosed herein are doorway protection systems and methods that protects against impact between a moving vehicle and a physical structure, e.g., wall, of a facility that has an entryway or doorway through which vehicles enter and exit the facility. For example, the system and method may protect the physical structure, e.g., wall, around the doorway of a hangar facility from accidental impact by an aircraft under tow. In one configuration, one or more monitored planes are defined relative to the sides and top of the entryway. A network of sensors placed a distance from the sides and top monitor for penetration or intrusion of the monitored plane by an object, e.g. aircraft, ground support vehicle, etc. If a monitored plane is penetrated, the system and method activate an aural and visual alarm to signal the tug operator of a potential impact between the object and the entryway wall of the facility. In another configuration, a pair of monitored frames are defined relative to the entryway structure, one relative to the outside surface of the structure and the other relative to the inside surface of the structure. A pair of sensors, each placed a distance from a respective one of the inside surface and outside surface, monitors for penetration or intrusion of the monitored frame by an object, e.g. aircraft, ground support vehicle, etc. If a monitored frame is penetrated, the system and method activate an aural and visual alarm to signal the tug operator of a potential impact between the object and the entryway wall of the facility.

Figure 9C:
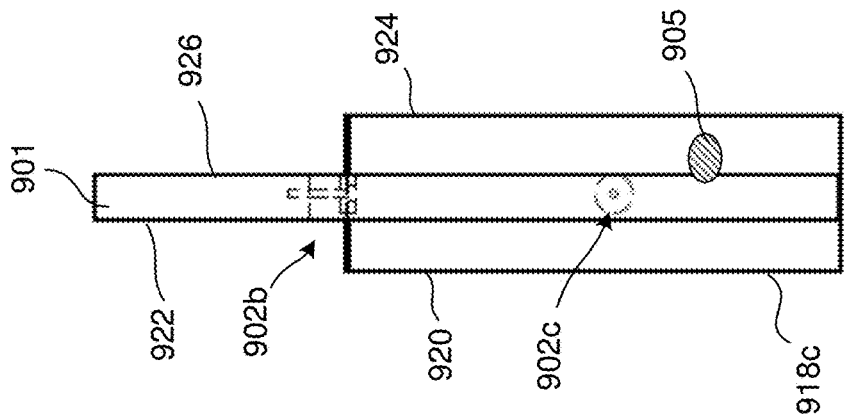
Figure 9B:
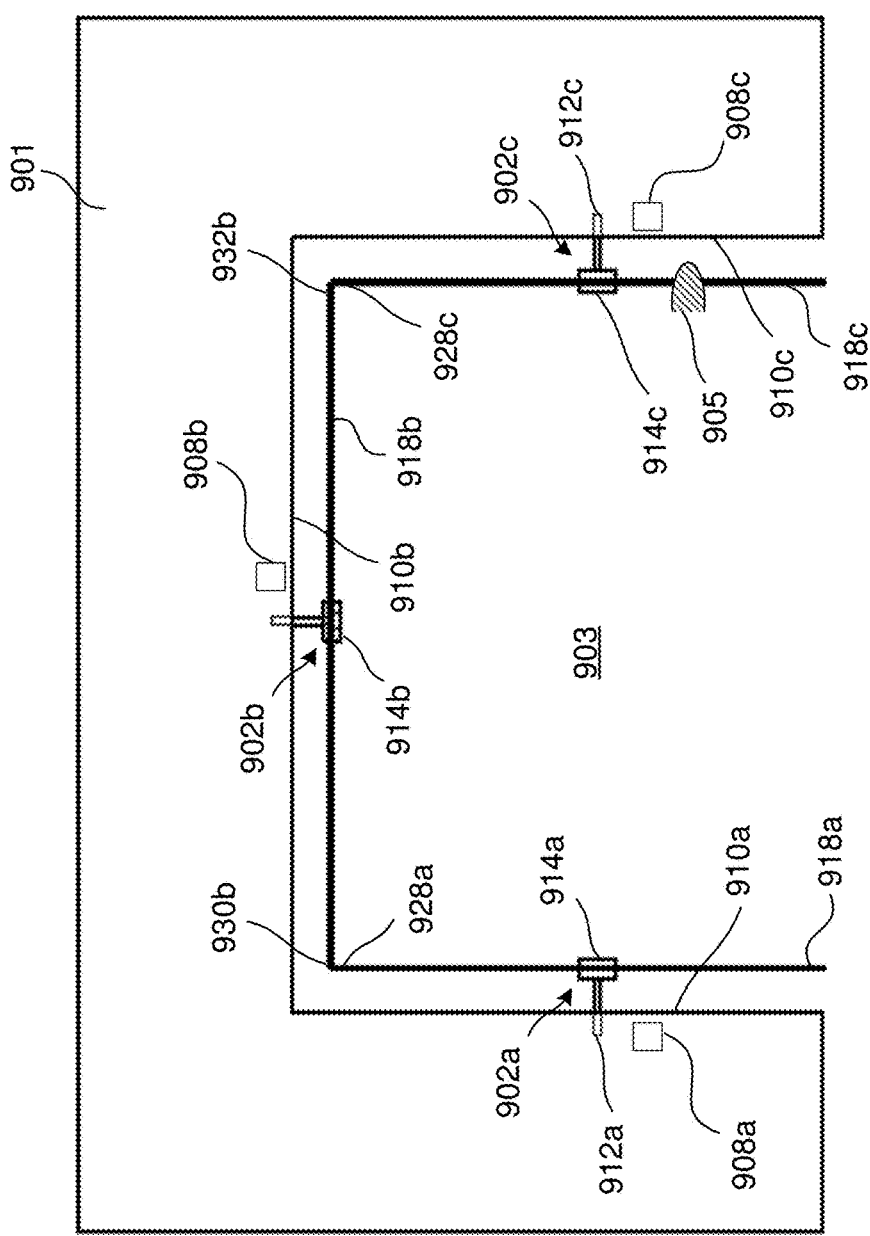

With reference to FIGS. 9A-9C, in one configuration, a doorway protection system 900 installed in an aircraft hangar and configured in accordance with the concepts disclosed herein includes three measurement modules 902*a*, 902*b*, 902*c*, a detection module 904 with three pre-defined monitored plane data sets 906*a*, 906*b*, 906*c*, and three alarm modules 908*a*, 908*b*, 908*c*. Each measurement module 902*a*, 902*b*, 902*c* is similar to those described above with reference to FIGS. 2-4 and includes a sensor 914*a*, 914*b*, 914*c* mounted on a rotational motor.

The modules of the doorway protection system 900 are communicatively coupled together to allow information and data from the measurement modules 902*a*, 902*b*, 902*c* to reach the detection module 904, and to allow control signals from the detection module 904 to reach the alarm modules 908*a*, 908*b*, 908*c*. The communication coupling may be wired or wireless.

Each of the measurement modules 902*a*, 902*b*, 902*c* is associated with a respective edge of a physical structure 901, e.g., a doorway wall, that defines a doorway 903 of the hangar. For example, the first measurement module 902*a* is associated with a first side edge 910*a* of the doorway wall 901, the second measurement module 902*b* is associated with the top edge 910*b* of the doorway wall, and the third measurement module 902*c* is associated with a second side edge 910*c* of the doorway wall. The respective associations between the measurement modules 902*a*, 902*b*, 902*c* and the edges 910*a*, 901*b*, 910*c* places the measurement modules in a spaced apart relationship with the edge. To this end, each measurement modules 902*a*, 902*b*, 902*c* may be located on a pole 912*a*, 912*b*, 912*c* or rod that projects outward from the edge 910*a*, 910*b*, 910*c*.

Each of the alarm modules 908a, 908b, 908c may be associated with a respective physical structure of the hangar in a vicinity of an edge of the doorway wall 901. For example, the first alarm module 908a may be associated with a surface of the doorway wall 901 near the first side edge 910a of the doorway, the second alarm module 908b may be associated with a surface of the doorway wall near the top edge 910b of the doorway, and the third alarm module 908c may be associated with a surface of the doorway wall 901 near the second side edge 910c of the doorway. In an alternative configuration, the alarm modules 908a, 908b, 908c may be integrated with a respective measurement modules 902a, 902b, 902c.

With continued reference to FIGS. 9A-9C, in one configuration the detection module 904 defines a monitored plane 918a, 918b, 918c for each respective edge 910a, 910b, 910c of the doorway wall 901. These monitored planes 918a, 918b, 918c are not physical in nature, but are instead virtual planes, each of which is spaced apart from its respective edge 910a, 910b, 910c and extends a distance, e.g., between 1 and 6 feet, into the hangar and out of the hangar. These monitored planes 918a, 918b, 918c are defined by monitored plane data sets 906a, 906b, 906c that include a number of baseline measurements, each corresponding to a distance between a sensor 914a, 914b, 914c spaced apart from a respective edge 910a, 910b, 910c and a virtual end of a monitored plane. The area size of each monitored plane 918a, 918b, 918c defines a protected area around its respective edge 910a, 910b, 910c. The distance between each edge 910a, 910b, 910c and its respective monitored plane 918a, 918b, 918c defines a protected space for the doorway wall 901. These distances are defined by the length of the pole 912a, 912b, 912c to which the sensors 914a, 914b, 914c are attached. The distance is typically in the range of 1 to 6 feet.

During a detection phase of the doorway protection system 900, subsequent distance measurements are obtained by the measurement modules 902a, 902b, 902c and provided to the detection module 906. From these subsequent measurements, the detection module 906 determines if an object has breached or crossed through a monitored plane 918a, 918b, 918c and into a protected space of the doorway wall 901. If a breach or intrusion has occurred, the detection module 906 outputs an activation signal to a corresponding alarm module 908a, 908b, 908c. The alarm module 908a, 908b, 908c may be visual or aural in nature. For example, the alarm module 908a, 908b, 908c may include lights configured to flash and/or speakers configured to output an alarm sound.

Having thus described the configuration and operation of the doorway protection system 900 at a general level, a more detailed description follows.

Figure 10:
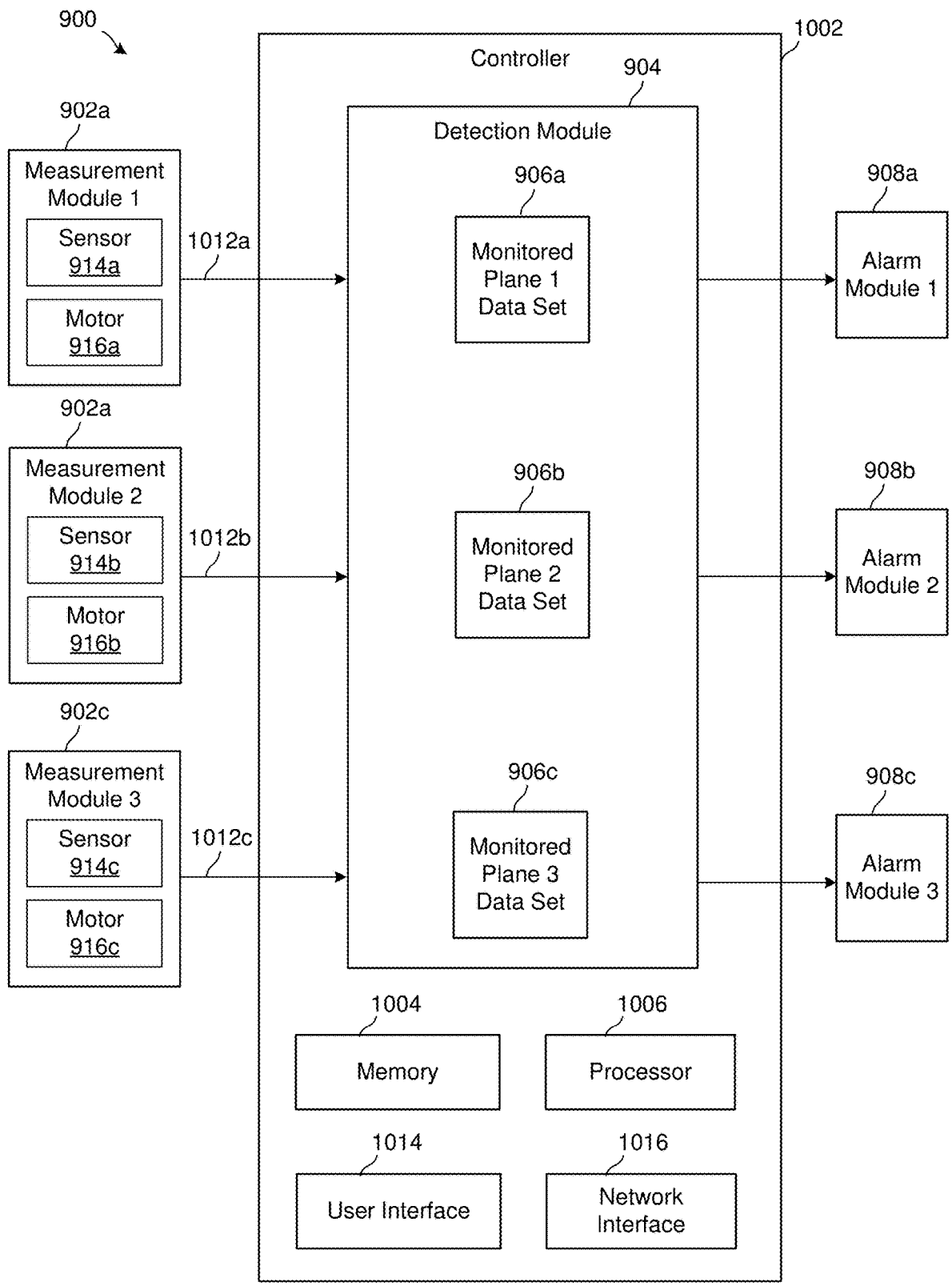
FIG. 10 is a block diagram of the hangar doorway protection system of FIGS. 9A-9C.

With reference to FIG. 10, the doorway protection system 900 includes one or more measurement modules 902a, 902b, 902c, a detection module 904 including one or more monitored plane data sets 906a, 906b, 906c, and one or more alarm modules 908a, 908b, 908c. The number of measurement modules 902a, 902b, 902c and alarm modules 908a, 908b, 908c typically corresponds to the number of edges of the doorway wall 901 for which protection is sought, which is usually three. The detection module 904 may be embodied in a controller 1002 having a memory 1004 and a processor 1006 programmed to implement the features of the detection module 904 as disclosed herein.

As described above, each of the measurement modules 902a, 902b, 902c includes a sensor 914a, 914b, 914c that is configured to provide distance measurements between itself and objects, e.g., aircraft wing, etc., near the sensor. Each sensor 914a, 914b, 914c in turn, is associated with a motor 916a, 916b, 916c that is configured to rotate at a particular rotation rate in accordance with a control signal output by the controller 1002.

In one configuration, the sensor 914a, 914b, 914c is a light detection and ranging (LIDAR) sensor that utilizes a pulsed laser light and time of flight calculations to determine distance measurements. An example LIDAR sensor 914a, 914b, 914c that may be employed by the doorway protection system 900 is a RPLIDAR A3 sensor manufactured by Slamtec. In another configuration, the sensor 914a, 914b, 914c may be a RPLIDAR A29 sensor, also manufactured by Slamtec. In yet another configuration, the sensor 914a, 914b, 914c may be a TG30 LIDAR manufactured by YDLIDAR. In either configuration, the sensor 914a, 914b, 914c is configured to output data 1012a, 1012b, 1012c corresponding to distance measurements at a programmable rate. For example, the sensors 914a, 914b, 914c may be programmed to output distance measurements 1012a, 1012b, 1012c at a rate of one per one-thirty-six-hundredths (1/3600) of a second, which equates to 3600 measurements per second.

The monitored plane data sets 906a, 906b, 906c include a list of baseline measurements that define a corresponding one of the monitored planes 918a, 918b, 918c. To this end, a baseline measurement is provided for each degree of rotation at which a measurement module 902a, 902b, 902c is configured to obtain a measurement. Each baseline measurement includes 1) a distance between a measurement module and one of a plurality of virtual ends of the monitored plane, and 2) is identified by an angle parameter.

Figure 11:
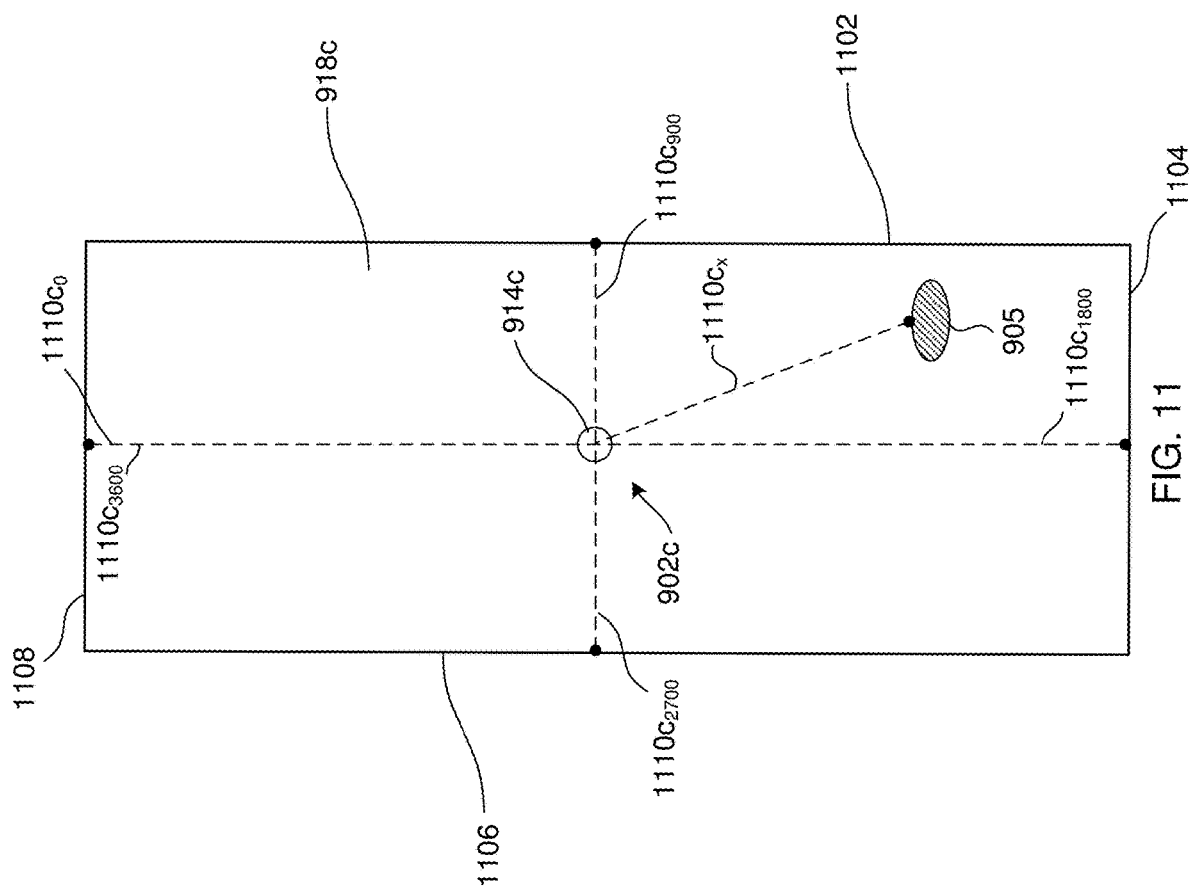
FIG. 11 is a plan view of a monitored plane relative to an edge of a physical structure of a hangar that includes a doorway, and showing a number of baseline measurements that define the monitored plane.

With reference to FIG. 11, a plane corresponding to the monitored plane 918c shown in FIG. 9A includes four virtual ends 1102, 1104, 1106, 1108. The monitored plane data set 906c for this monitored plane 918c includes a baseline measurement 1110 for each of one-tenth degree of rotation of the measurement module 902c. For clarity of illustration, only four baseline measurements 1110 are shown in FIG. 11. These measurements include:

1) a baseline measurement $1110c_{900}$ corresponding to a 90 degree rotation point of the measurement module 902c, which is set to a value equal to the distance between the measurement module and the first virtual end 1102 of the monitored plane 918c;

2) a baseline measurement $1110c_{1800}$ corresponding to a 180 degree rotation point of the measurement module 902c, which is set to a value equal to the distance between the measurement module and the second virtual end 1104 of the monitored plane 918c;

3) a baseline measurement $1110c_{2700}$ corresponding to a 270 degree rotation point of the measurement module 902c, which is set to a value equal to the distance between the measurement module and the third virtual end 1106 of the monitored plane 918c; and 4) a baseline measurement $1110c_{3600}$ corresponding to a 360 degree rotation point of the measurement module 902c, which is set to a value equal to the distance between the measurement module and the fourth virtual end 1108 of the monitored plane 918c.

In the example of FIG. 11, the monitored plane data set 906c comprises 3600 instances or data points, each defined by a distance measurement and an angle parameter. The monitored plane data sets 906a, 906b are similarly defined. Portions of an example monitored plane data set 906c are provided in Table 2.

TABLE 2

| Angle parameter (degree of rotation) | Distance measurement (millimeters) |
|---|---|
| 180.0 | 3600 |
| 180.1 | 3600 |
| 180.2 | 3605 |
| 180.3 | 3605 |
| 180.4 | 3610 |
| 180.5 | 3610 |
| 180.6 | 3615 |
| 180.7 | 3615 |
| 180.8 | 3620 |
| 180.9 | 3620 |
| ⋮ | ⋮ |
| 270.0 | 610 |
| 270.1 | 610 |
| 270.2 | 611 |
| 270.3 | 611 |
| 270.4 | 612 |
| 270.5 | 612 |
| 270.6 | 613 |
| 270.7 | 613 |
| 270.8 | 614 |
| 270.9 | 614 |

The detection module 904 receives subsequent measurements 1012a, 1012b, 1012c from each of measurement modules 902a, 902b, 902c and evaluates the subsequent measurements relative to the baseline measurements. To this end, the detection module 904 is configured to control rotation of the motor 916a, 916b, 916c of each respective measurement module 902a, 902b, 902c so its associated sensor rotates at a set rate corresponding to the same rate used to define the baseline measurements. For example, the detection module 904 may be programmed to output a control signal to each motor 916a, 916b, 916c that causes the motor and it associated sensor 914a, 914b, 914c to rotate 360 degrees per second. Thus, rotating at a rate of 360 degrees per second and providing distance measurements 1012a, 1012b, 1012c at a rate of 3600 per second, the measurement modules 902a, 902b, 902c provide 3600 distance measurements for each 360 degree rotation of the sensor. In other words, the measurement modules 902a, 902b, 902c provide a distance measurement 1012a, 1012b, 1012c every one-tenth of a degree of rotation.

For each doorway edge 910a, 910b, 910c protected by a monitored plane 918a, 918b, 918c, the detection module 904 may evaluate subsequent distance measurements 1012a, 1012b, 1012c provided by the measurement module 902a, 902b, 902c associated with that surface relative to its corresponding baseline measurement included in the relative monitored plane data set 906a, 906b, 906c to determine if an object has penetrated or intruded the monitored plane. For example, as described above with reference to FIG. 6, an object 602 may be considered to breach or intrude a monitored plane 218b when a part 604 or portion of it pass through the plane. The object 602 may be, for example, a tip of an aircraft wing. Likewise, with reference to FIGS. 9B, 9C and 11, an object 905 may be considered to breach or intrude a monitored plane 918a, 918b, 918c when a part or portion of it passes through the plane. The detection module 904 detects such intrusions by comparing, in real time, one or more subsequent measurements 1012a, 1012b, 1012c to corresponding baseline measurements to determine an intrusion state for each monitored plane. The detection module 904 may conclude that an intrusion of a monitored plane 918a, 918b, 918c occurred in accordance with any one of the various configurations described above with reference to FIG. 7, the details of which are not repeated at this stage of the disclosure.

Figure 12:
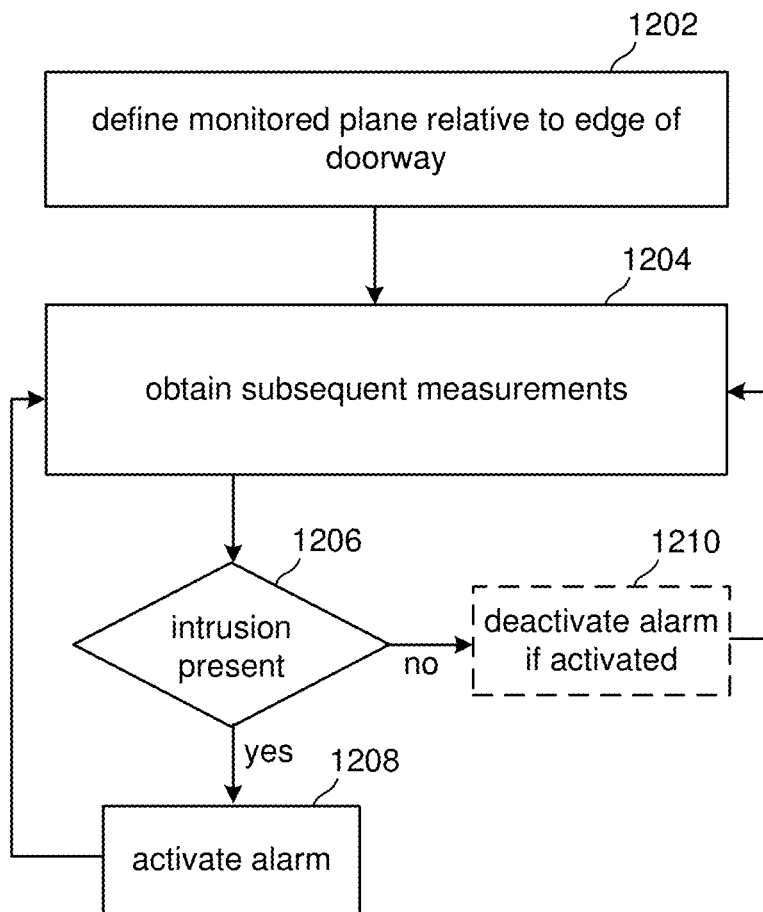
FIG. 12 is a flowchart of operation of the doorway protection system of FIG. 10.

FIG. 12 is a flowchart of a method of protecting against impact between a vehicle and a physical structure, e.g., doorway wall, of a facility that has opening or doorway for the vehicle to pass through. The method may be performed by the doorway protection system 900 of FIGS. 9A-9C and 10.

At block 1202, a monitored plane 918a, 918b, 918c is defined for at least one edge 910a, 901b, 910c of the physical structure 901, e.g., a doorway wall, that includes the doorway 903. The monitored plane is defined by a plurality of baseline. For example, with reference to FIG. 11, monitored plane 918c is defined by a plurality of baseline measurements 1110c, each of which corresponds to a distance between a sensor 914c spaced apart from the edge and one of a plurality of virtual ends 1102, 1104, 1106, 1108 of the monitored plane, and is identified by an angle parameter. Returning to FIGS. 9A-9C, each of the monitored planes 918a, 918b, 918c may be defined by a corresponding monitored plane data set 906a, 906b, 906c that includes the plurality of baseline measurements and is stored in a detection module 904 of the doorway protection system 900.

In one configuration, and continuing with the monitored plane 918c shown in FIG. 11, the angle parameter identifying a particular baseline measurement 1110c is a n degree of rotation of the sensor 914c. Returning again to FIGS. 9A-9C, the virtual ends 1102, 1104, 1106, 1108 of a monitored plane 918a, 918b, 918c include an inside end 920 at the interior of the facility that is spaced a distance from an inside surface 922 of the doorway wall 901, and an outside end 924 at the exterior of the facility that is spaced a distance from an outside surface 926 of the doorway wall. The distances between these ends 920, 924 and their respective surfaces 922, 926 may be in the range of 1 to 6 feet.

Regarding the plurality of edges of the doorway wall 901 that define the doorway 903, these edges may include a first side edge 910a, a second side edge 910c opposite the first side edge, and a top edge 910b spanning the first side edge and the second side edge. In this case, the plurality of virtual ends of the vertical monitored plane 918a, 918c for either of the first side edge 910a or the second side edge 910c further comprises a top end 928a, 928c, 1108 spaced a distance from the top edge 910b of the opening, and the plurality of virtual ends for the horizontal monitored plane 918b for the top edge 910b further comprises a first end 930b a distance from the first side edge 910a and a second end 932b a distance from the second side edge 910c. The distances between these ends 928a, 928c, 930b, 932b and their respective edges 910a, 910b, 910c may be in the range of 1 to 3 feet.

Returning to FIG. 12, at block 1204, a subsequent measurement is obtained. To this end, a sensor 914a, 914b, 914c is rotated relative to the edge 910a, 901b, 910c, and a plurality of subsequent measurements are obtained. For example, a subsequent measurement may be obtained at every n degree of rotation of the sensor.

At block 1206, the subsequent measurement is evaluated relative to a corresponding baseline measurement to determine if a criterion indicative of an intrusion of the monitored plane is satisfied. In one configuration, the criterion is satisfied when a subsequent measurement at an n degree of rotation is less than a value that is based on the corresponding baseline measurement identified by the n degree of rotation. For example, with reference to FIGS. 9B, 9C, and 11, if an object 905, e.g., an end of an aircraft wing, enters into a monitored plane 918c, a subsequent measurement $1110c_x$ obtained by the sensor 914c at an n degree of rotation that aligns the beam of the senor with the object will result in a subsequent measurement less than the baseline measurement corresponding to that n degree of rotation.

At block 1208, an alarm associated with an alarm module 908a, 908b, 908c is activated when the criterion is satisfied. Continuing with the monitored plane 918c of FIG. 11, after an alarm is activated, another measurement of the subsequent measurement $1110c_x$ that triggered the alarm is obtained and evaluated relative to the corresponding baseline measurement to determine if the criterion indicative of the intrusion of the monitored plane 918c is no longer satisfied. At block 1210, the alarm is deactivated when the criterion is no longer satisfied. These other measurement of the subsequent measurement $1110c_x$ may be obtained during each rotation of the sensor 914c.

Figure 13A:
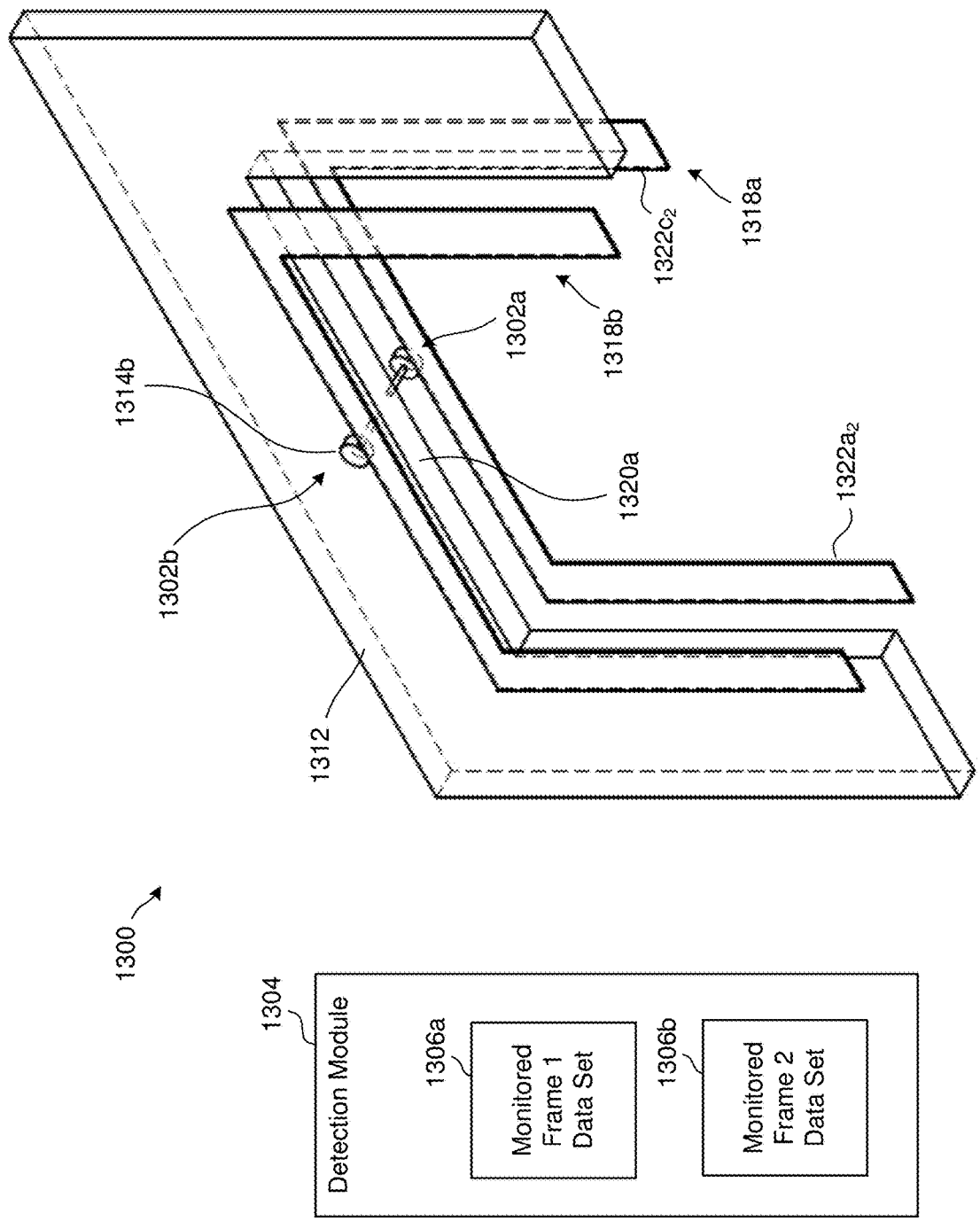

With reference to FIGS. 13A-13C, in another one configuration, a doorway protection system 1300 installed in an aircraft hangar and configured in accordance with the concepts disclosed herein includes two measurement modules 1302a, 1302b, a detection module 1304 with two predefined monitored frame data sets 1306a, 1306b, and two alarm modules 1308a, 1308b. Each measurement module 1302a, 1302b is similar to those described above with reference to FIGS. 2-4 and includes a sensor 1314a, 1314b mounted on a rotational motor.

The modules of the doorway protection system 1300 are communicatively coupled together to allow information and data from the measurement modules 1302a, 1302b to reach the detection module 1304, and to allow control signals from the detection module 1304 to reach the alarm modules 1308a, 1308b. The communication coupling may be wired or wireless.

Each of the measurement modules 1302a, 1302b is associated with a respective one of an outside surface 1310a and an inside surface 1310b of a physical structure 1312, e.g., a doorway wall, that includes the doorway of the hangar. For example, the first measurement module 1302a may be associated with the outside surface 1310a of the doorway wall 1312 and the second measurement module 1302b may be associated with the inside surface 1310b of the doorway wall. The respective associations between the measurement modules 1302a, 1302b and the surfaces 1310a, 1301b places the measurement modules in a spaced apart relationship with the surface. To this end, each measurement modules 1302a, 1302b, may be located on a pole or rod that projects outward from the surface 1310a, 1310b.

Each of the alarm modules 1308a, 1308b may be associated with a respective one of the outside surface 1310a and inside surface 1310b of the doorway wall 1312 in a vicinity of the doorway. For example, the first alarm module 1308a may be associated with the outside surface 1310a of the doorway wall 1312 near a top edge 1320b of the doorway and the second alarm module 1308b may be associated with the inside surface 1310b of the doorway wall 1312 also near the top edge of the doorway. In an alternative configuration, the alarm modules 1308a, 1308b may be integrated with a respective measurement modules 1302a, 1302b.

With continued reference to FIGS. 13A-13C, in one configuration the detection module 1304 defines a monitored frame 1318a, 1318b for each respective outside surface 1310a and inside surface 1310b of the doorway wall 1312. These monitored frames 1318a, 1318b are not physical in nature, but are instead virtual frames, each of which is generally parallel to and spaced apart from its respective surface 1310a, 1310b. These monitored frames 1318a, 1318b are defined by monitored frame data sets 1306a, 1306b that include a number of baseline measurements, each corresponding to a distance between a sensor 1314a, 1314b spaced apart from a respective surface 1310a, 1310b and a virtual end of a monitored frame. The distance between each surface 1310a, 1310b and its respective monitored frame 1318a, 1318b defines a protected space for the doorway wall 1312. These distances are defined by the length of the pole to which each sensors 1314a, 1314b is attached. The distance is typically in the range of 1 to 3 feet.

Each monitored frame 1318a, 1318b is defined by a number of virtual ends. For example, the outside monitored frame 1318a may be defined by: 1) a pair of generally parallel and spaced apart first-side virtual ends $1322a_1$, $1322a_2$, one of which is generally aligned with the first edge 1320a of the doorway wall 1312, 2) a pair of generally parallel and spaced apart second-side virtual ends $1322c_1$, $1322c_2$, one of which is generally aligned with the second edge 1320c of the doorway wall, 3) a pair of generally parallel and spaced apart top virtual ends $1322b_1$, $1322b_2$, one of which is generally aligned with the top edge 1320b of the doorway wall, and 4) a pair of bottom virtual ends 1322d, 1322e, one on either side of the doorway wall and generally aligned with the bottom of the surface 1310a. The distances between the spaced apart first-side virtual ends $1322a_1$, $1322a_2$, the spaced apart second-side virtual ends $1322c_1$, $1322c_2$, and the spaced apart top virtual ends $1322b_1$, $1322b_2$ define the area size of the monitored frame 1318a, 1318b and thus define a protected area for the doorway wall 1312 around the doorway. These distances are typically in the range of 1 to 3 feet; and in one configuration, the distance between the top virtual ends $1322b_1$, $1322b_2$ is less than the distances between the first-side virtual ends $1322a_1$, $1322a_2$ and the second-side virtual ends $1322c_1$, $1322c_2$.

During a detection phase of the doorway protection system 1300, subsequent distance measurements are obtained by the measurement modules 1302a, 1302b and provided to the detection module 1306. From these subsequent measurements, the detection module 1306 determines if an object has breached or crossed through a monitored frame 1318a, 1318b. If a breach or intrusion has occurred, the detection module 1306 outputs an activation signal to a corresponding alarm module 1308a, 1308b. The alarm module 1308a, 1308b may be visual or aural in nature. For example, the alarm module 1308a, 1308b may include lights configured to flash and/or speakers configured to output an alarm sound.

Having thus described the configuration and operation of the doorway protection system 1300 at a general level, a more detailed description follows.

Figure 14:
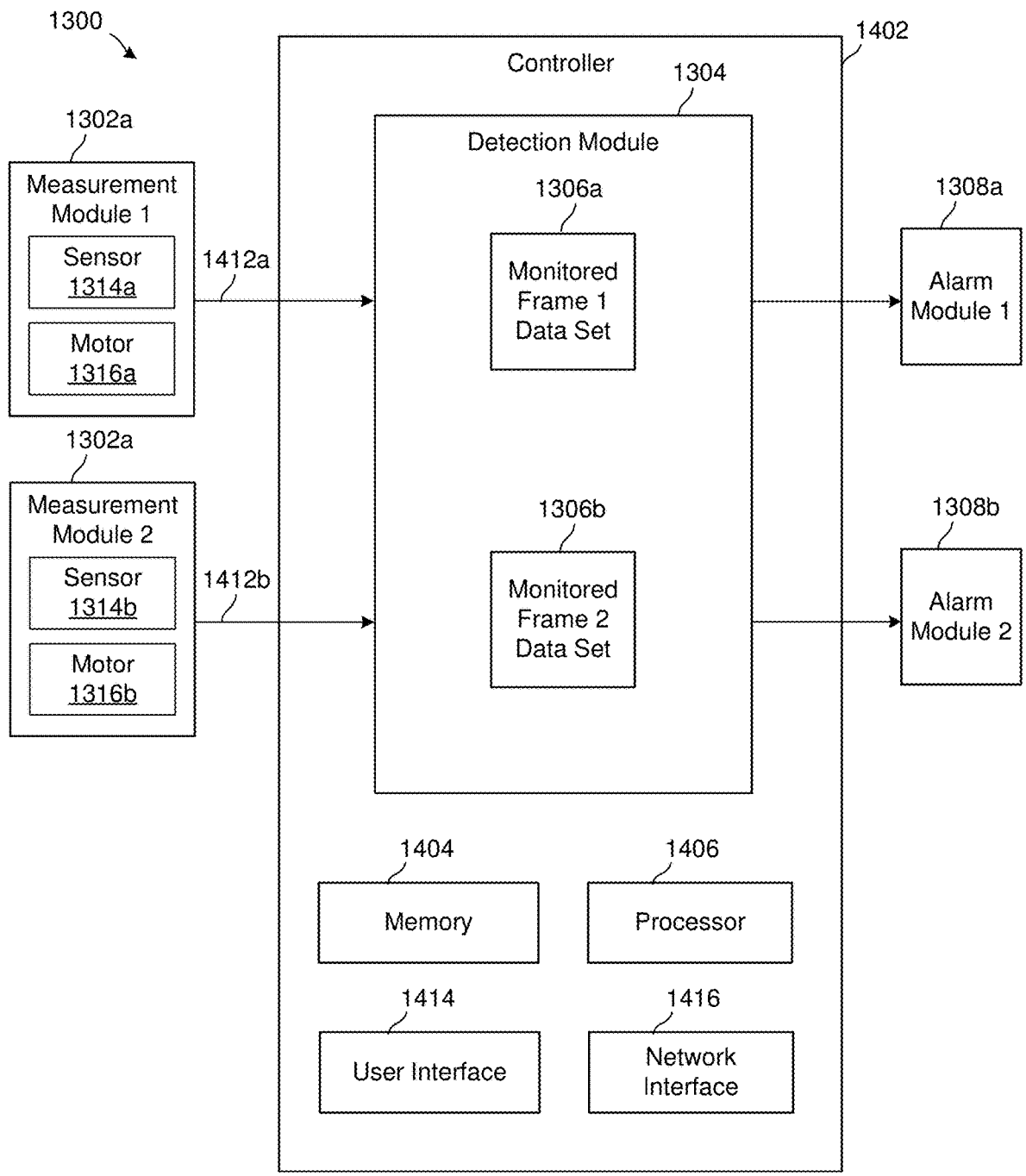
FIG. 14 is a block diagram of the hangar doorway protection system of FIGS. 13A-13C.

With reference to FIG. 14, the doorway protection system 1300 includes one or more measurement modules 1302a, 1302b, a detection module 1304 including one or more monitored frame data sets 1306a, 1306b, and one or more alarm modules 1308a, 1308b. The number of measurement modules 1302a, 1302b and alarm modules 1308a, 1308b typically corresponds to the number of surfaces of the doorway wall 1312 for which protection is sought, which is usually two. The detection module 1304 may be embodied in a controller 1402 having a memory 1404 and a processor 1406 programmed to implement the features of the detection module 1304 as disclosed herein.

As described above, each of the measurement modules 1302a, 1302b includes a sensor 1314a, 1314b that is configured to provide distance measurements between itself and objects, e.g., aircraft wing, etc., near the sensor. Each sensor 1314a, 1314b in turn, is associated with a motor 1316a, 1316$b$ that is configured to rotate at a particular rotation rate in accordance with a control signal output by the controller 1402.

In one configuration, the sensor 1314$a$, 1314$b$ is a light detection and ranging (LIDAR) sensor that utilizes a pulsed laser light and time of flight calculations to determine distance measurements. An example LIDAR sensor 1314$a$, 1314$b$ that may be employed by the doorway protection system 1300 is a RPLIDAR A3 sensor manufactured by Slamtec. In another configuration, the sensor 1314$a$, 1314$b$ may be a RPLIDAR A29 sensor, also manufactured by Slamtec. In yet another configuration, the sensor 1314$a$, 1314$b$ may be a TG30 LIDAR manufactured by YDLIDAR. In either configuration, the sensor 1314$a$, 1314$b$ is configured to output data 1412$a$, 1412$b$ corresponding to distance measurements at a programmable rate. For example, the sensors 1314$a$, 1314$b$ may be programmed to output distance measurements 1412$a$, 1412$b$ at a rate of one per one-thirty-six-hundredths ($\frac{1}{3600}$) of a second, which equates to 3600 measurements per second.

The monitored frame data sets 1306$a$, 1306$b$ include a list of baseline measurements that define a corresponding one of the monitored frames 1318$a$, 1318$b$. To this end, a set of baseline measurements is provided for each degree of rotation at which a measurement module 1302$a$, 1302$b$ is configured to obtain a measurement. Each baseline measurement in a set of baseline measurements includes 1) a distance between a measurement module and one of the plurality of virtual ends 1322$a_1$, 1322$a_2$, 1322$b1$, 1322$b_2$, 1322$c_1$, 1322$c_2$, 1322$d$, 1322$e$ of the monitored frame, and 2) is identified by an angle parameter.

Figure 15:
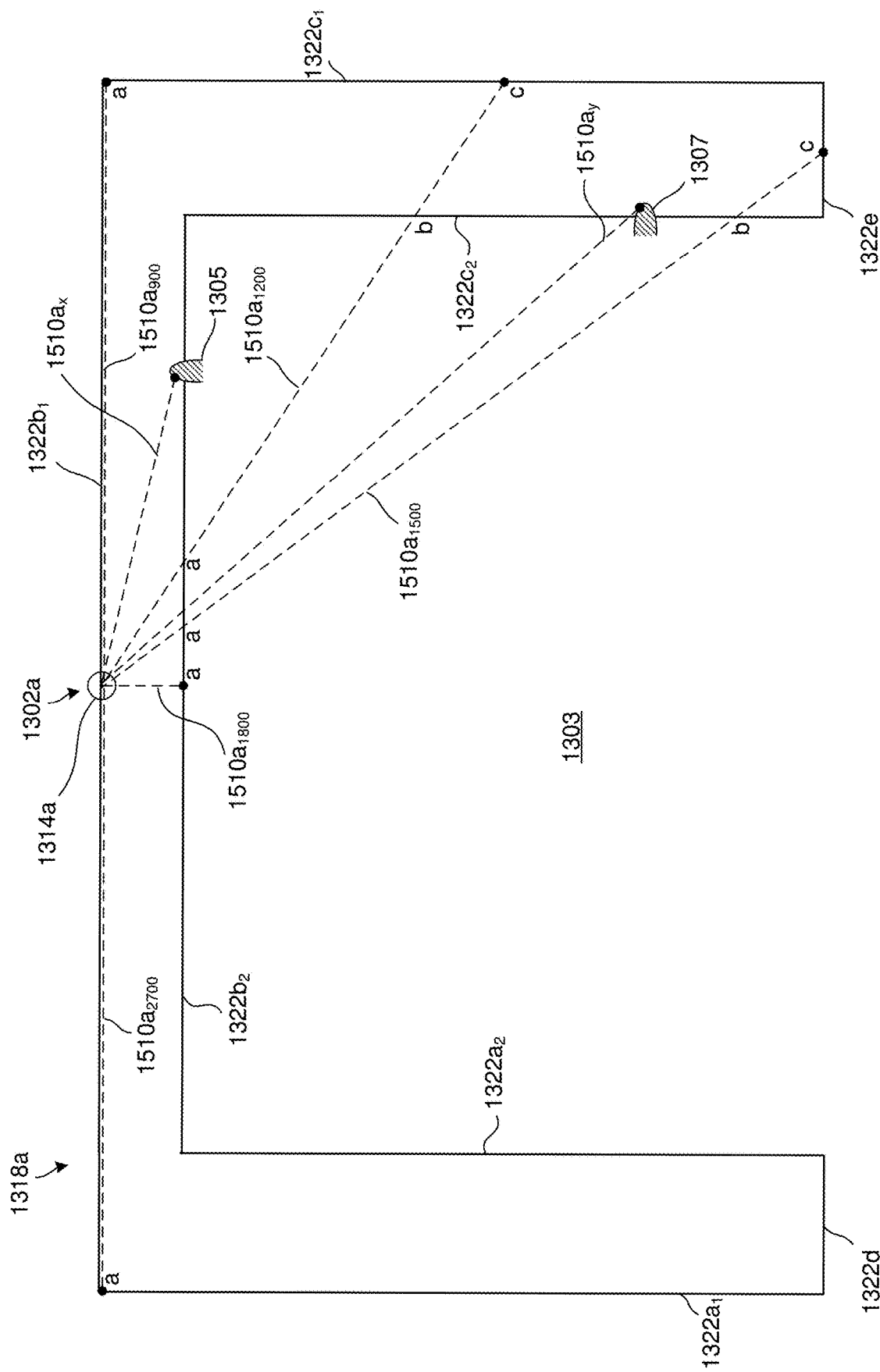
FIG. 15 is a plan view of a monitored plane relative to an edge of a physical structure of a hangar that includes a doorway, and showing a number of baseline measurements that define the monitored plane.

With reference to FIG. 15, a frame corresponding to the monitored frame 1318$a$ shown in FIG. 13B includes eight virtual ends 1322$a_1$, 1322$a_2$, 1322$b_1$, 1322$b_2$, 1322$c_1$, 1322$c_2$, 1322$d$, 1322$e$. The monitored frame data set 1306$a$ for this monitored plane 1318$a$ includes a set of baseline measurements for a number of one-tenth degree rotations of the measurement module 1302$a$. In the configuration shown in FIG. 15, the monitored frame data set 1306$a$ includes a set of baseline measurements for each one-tenth degree of rotation of the measurement module 1302$a$ between 90 degrees and 270 degrees corresponding to the lower half of the circle of rotation of the measurement module. Measurements between 0 degrees and 89.9 degrees and between 270.1 and 360 degrees corresponding to the upper half of the circle of rotation are not relevant as they are outside of the monitored frame 1318$a$ defined by the virtual ends 1322$a_1$, 1322$a_2$, 1322$b_1$, 1322$b_2$, 1322$c_1$, 1322$c_2$, 1322$d$, 1322$e$. A set of baseline measurements may include one or three individual baseline measurements.

For clarity of illustration, only four sets of baseline measurements 1510$a$ are shown in FIG. 15. These measurements include:

1) a set of baseline measurements 1510$a_{900}$ corresponding to a 90 degree rotation point of the measurement module 1302$a$, which includes a single baseline measurement set to a value equal to the distance between the measurement module and the virtual end 1322$c_1$ of the monitored frame 1318$a$, which is identified as point "a";

2) a set of baseline measurements 1510$a_{1200}$ corresponding to a 120 degree rotation point of the measurement module 1302$a$, which includes three baseline measurements including one set to a value equal to the distance between the measurement module and the virtual end 1322$b_2$ of the monitored frame 1318$a$, which is identified as point "a", a second one set to a value equal to the distance between the measurement module and the virtual end 1322$c_2$ of the monitored frame 1318$a$, which is identified as point "b", and a third one set a value equal to the distance between the measurement module and the virtual end 1322$c_1$ of the monitored frame 1318$a$, which is identified as point "c";

3) a set of baseline measurements 1510$c_{1800}$ corresponding to a 180 degree rotation point of the measurement module 1302$a$ includes a single baseline measurement set to a value equal to the distance between the measurement module and the virtual end 1322$b_2$ of the monitored plane 1318$a$, which is identified as point "a"; and 4) a set of baseline measurements 1510$a_{2700}$ corresponding to a 270 degree rotation point of the measurement module 1302$a$, which includes a single baseline measurement set to a value equal to the distance between the measurement module and the virtual end 1322$a_1$ of the monitored frame 1318$a$, which is identified as point "a".

In the example of FIG. 15, the monitored frame data set 1306$a$ comprises 1800 sets of instances or data points, each defined by a distance measurement and an angle parameter. The monitored frame data sets 1306$b$ may be similarly defined. Portions of an example monitored frame data set 1306$a$ are provided in Table 3.

TABLE 3

| Angle parameter (degree of rotation) | Distance "a" measurement (millimeters) | Distance "b" measurement (millimeters) | Distance "c" measurement (millimeters) |
|---|---|---|---|
| 90.0 | 14000 | — | — |
| 90.1 | 14000 | — | — |
| 90.2 | 14010 | — | — |
| 90.3 | 14010 | — | — |
| 90.4 | 14015 | — | — |
| ⋮ | ⋮ | ⋮ | ⋮ |
| 120.0 | 600 | 13500 | 16000 |
| 120.1 | 600 | 13500 | 16000 |
| 120.2 | 605 | 13550 | 16050 |
| 120.3 | 605 | 13550 | 16050 |
| 120.4 | 608 | 13558 | 16058 |
| ⋮ | ⋮ | ⋮ | ⋮ |
| 180.0 | 400 | — | — |
| 180.1 | 400 | — | — |
| 180.2 | 405 | — | — |
| 180.3 | 405 | — | — |
| 180.4 | 410 | — | — |

The detection module 1304 receives subsequent measurements 1412$a$, 1412$b$ from each of measurement modules 1302$a$, 1302$b$ and evaluates the subsequent measurements relative to the sets of baseline measurements. To this end, the detection module 1304 is configured to control rotation of the motor 1316$a$, 1316$b$ of each respective measurement module 1302$a$, 1302$b$ so its associated sensor rotates at a set rate corresponding to the same rate used to define the sets of baseline measurements. For example, the detection module 1304 may be programmed to output a control signal to each motor 1316$a$, 1316$b$ that causes the motor and it associated sensor 1314$a$, 1314$b$ to rotate 360 degrees per second. Thus, rotating at a rate of 360 degrees per second and providing distance measurements 1412$a$, 1412$b$ at a rate of 3600 per second, the measurement modules 1302$a$, 1302$b$ provide 3600 distance measurements for each 360 degree rotation of the sensor. In other words, the measurement modules 1302$a$, 1302$b$ provide a distance measurement 1412$a$, 1412$b$ every one-tenth of a degree of rotation.

For each doorway wall surface 1310$a$, 1310$b$ having an associated monitored frame 1318$a$, 1318$b$ the detection module 1304 may evaluate subsequent distance measurements 1412a, 1412b provided by the measurement module 1302a, 1302b associated with that surface relative to its corresponding sets of baseline measurements included in the relative monitored frame data set 1306a, 1306b to determine if an object has penetrated or intruded the monitored frame. An object may be considered to breach or intrude a monitored frame 1318a, 1318b when a part or portion of the object passes through the frame. The detection module 1304 detects such intrusions by comparing, in real time, one or more subsequent measurements 1412a, 1412b to a corresponding set of baseline measurements to determine an intrusion state for each monitored plane.

In one configuration, and with reference to FIG. 15 and Table 3, the detection module 1304 may conclude that an intrusion of a monitored frame 1318a, 1318b occurred when a subsequent measurement at a particular angle of rotation is less than measurement "a" for that angle of rotation. The detection module 1304 may also conclude that an intrusion of a monitored frame 1318a, 1318b occurred when a subsequent measurement at a particular angle of rotation is greater than measurement "b" for that angle of rotation but less than measurement "c" for that angle of rotation. In this configuration, the detection module 1304 ignores any subsequent measurements for an angle of rotation that are between measurements "a" and "b" for that angle. Accordingly the detection module 1304 does not activate an alarm when an object passes through the doorway.

Figure 16:
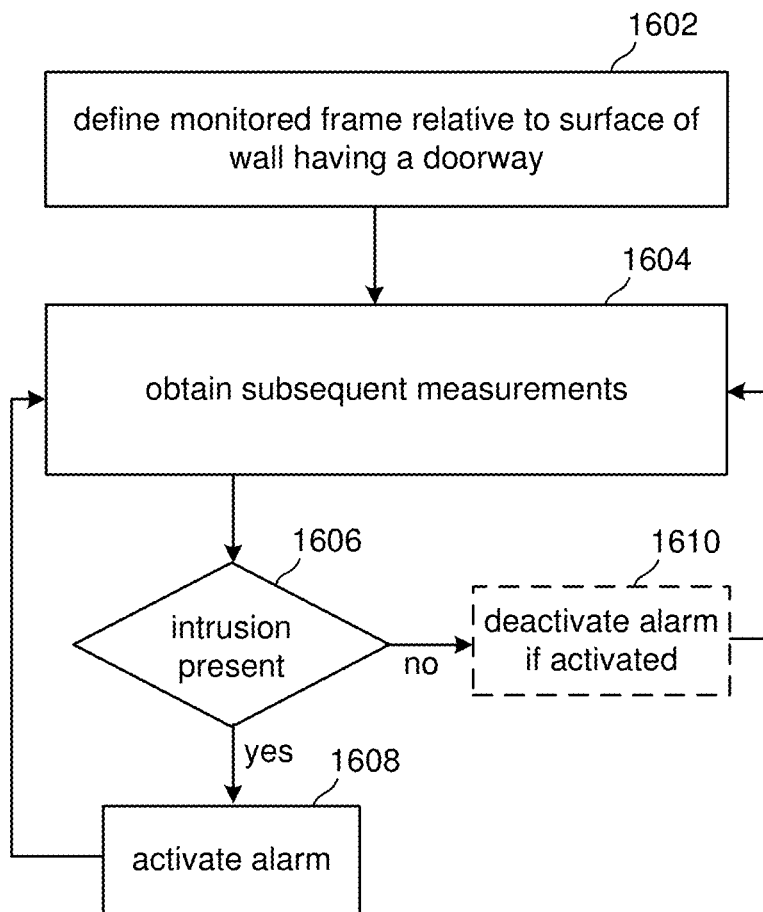
FIG. 16 is a flowchart of operation of the doorway protection system of FIG. 14.

FIG. 16 is a flowchart of a method of protecting against impact between a vehicle and a physical structure, e.g., doorway wall, of a facility that has opening or doorway for the vehicle to pass through. The method may be performed by the doorway protection system 900 of FIGS. 13A-13C and 14.

At block 1602, a monitored frame 1318a, 1318b is defined for at least one of the inside surface 1310a and the outside surface 1310b of the physical structure 1312, e.g., doorway wall, that includes the opening or doorway 1303. The monitored frame is defined by sets of baseline measurements. For example, with reference to FIG. 15, an exterior monitored frame 1318a is defined by sets of baseline measurements 1510a, each of which is identified by an angle parameter and includes at least one baseline measurement that corresponds to a distance between a sensor 1314a spaced apart from the exterior surface of the doorway wall and one of a plurality of virtual ends $1322a_1$, $1322a_2$, $1322b_1$, $1322b_2$, $1322c_1$, $1322c_2$, $1322d$, $1322e$ of the monitored frame. In one configuration, and continuing with the monitored plane 1318a shown in FIG. 15, the angle parameter identifying a particular set of baseline measurement 1510a is a n degree of rotation of the sensor 1314a.

With reference to FIG. 13B, the doorway 1303 is defined by a plurality of edges of the doorway wall 1312. These edges include a first vertical side edge 1320a, a second vertical side edge 1320c opposite the first side edge, and a top horizontal edge 1230b spanning the first side edge and the second side edge. The virtual ends $1322a_1$, $1322a_2$, $1322b_1$, $1322b_2$, $1322c_1$, $1322c_2$, $1322d$, $1322e$ of the monitored frame 1318a include a first inner end $1322a_1$ that is generally aligned with or near the first vertical side edge 1320a of the doorway 1303, a second inner end $1322c_1$ that is generally aligned with or near the second side edge 1320c of the opening, and an upper end $1322b_1$ that is generally aligned with or near the top edge 1320b of the opening.

Returning to FIG. 16, at block 1604, a subsequent measurement is obtained. To this end, a sensor 1314a, 1314b is rotated relative to the surface 1310a, 1310b and a plurality of subsequent measurements are obtained. For example, a subsequent measurement may be obtained at every n degree of rotation of the sensor.

At block 1606, the subsequent measurement is evaluated relative to a corresponding set of baseline measurement to determine if a criterion indicative of an intrusion of the monitored plane is satisfied. In one configuration, the criterion may be satisfied when a subsequent measurement at an n degree of rotation is less than a value that is based on the corresponding baseline measurement identified by the n degree of rotation. For example, with reference to FIGS. 13B and 15, if an object 1305, e.g., tip of an aircraft, enters into a top portion of a monitored frame 1318a, a subsequent measurement $1510a_x$ obtained by the sensor 1314a at an n degree of rotation that aligns the sensor beam with the object will result in a subsequent measurement less than the baseline measurement "a" corresponding to that n degree of rotation.

In another configuration, if an object 1307, e.g., end of an aircraft wing, enters into a side portion of a monitored frame 1318a, a subsequent measurement $1510a_y$ obtained by the sensor 1314a at an n degree of rotation that aligns the sensor beam with the object will result in a subsequent measurement between the baseline measurement "b" included in the corresponding set of baseline measurements identified by the n degree of rotation and the baseline measurement "c" included in the corresponding set of baseline measurements identified by the n degree of rotation.

At block 1608, an alarm associated with an alarm module 908a, 908b is activated when the criterion is satisfied. After an alarm is activated, another measurement of the subsequent measurement $1510a_x$, $1510a_y$ that triggered the alarm is obtained and evaluated relative to the corresponding set of baseline measurements to determine if the criterion indicative of the intrusion of the monitored plane 1318a, 1318b is no longer satisfied. At block 1610, the alarm is deactivated when the criterion is no longer satisfied. These other measurement of the subsequent measurement $1510a_x$, $1510a_y$ may be obtained during each rotation of the sensor 914a.

While some protection systems, such as those disclosed with reference to FIGS. 2-8, focus on protection of the solid or closed walls of a facility, and other protection systems, such as those described with reference to FIGS. 9A-16, focus on protection of doorway walls of such facilities, features and components of the respective protection systems may be combined to form a single protection system that protects the entirety of a facility.

The protection systems have been described and depicted herein in terms of different types of modules, e.g., measurement modules, detection module, and alarm modules, for purposes of aiding in various functional descriptions of the system. Regarding the physical structure of the protection systems, these different modules are not necessarily physically separate from each other may be all contained in one physical unit that communicates with a computer.

The various aspects of this disclosure are provided to enable one of ordinary skill in the art to practice the present invention. Various modifications to exemplary embodiments presented throughout this disclosure will be readily apparent to those skilled in the art. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method of protecting against impact between a vehicle and an object in a facility that houses the vehicle, the method comprising:
   defining a monitored plane relative to a surface of the facility, the monitored plane defined by a plurality of baseline measurements;
   obtaining a subsequent measurement;
   evaluating the subsequent measurement relative to a corresponding baseline measurement to determine if a criterion indicative of an intrusion of the monitored plane is satisfied; and
   activating an alarm when the criterion is satisfied.

2. The method of claim 1, wherein each of the plurality of baseline measurements: 1) corresponds to a distance between a sensor spaced apart from the surface and one of a plurality of virtual ends of the monitored plane, and 2) is identified by an angle parameter.

3. The method of claim 2, wherein the angle parameter identifying a particular baseline measurement is a n degree of rotation of the sensor.

4. The method of claim 1, wherein obtaining a subsequent measurement comprises:
   rotating a sensor relative to the surface, and
   obtaining a plurality of subsequent measurements, one at every n degree of rotation of the sensor.

5. The method of claim 4, wherein the criterion is satisfied when the subsequent measurement at an n degree of rotation is less than a value that is based on the corresponding baseline measurement identified by the n degree of rotation.

6. The method of claim 2, wherein the plurality of virtual ends of the monitored plane comprises four ends defining a rectangular monitored plane.

7. The method of claim 1, further comprising:
   after activating the alarm, evaluating another measurement of the subsequent measurement relative to the corresponding baseline measurement to determine if the criterion indicative of the intrusion of the monitored plane is no longer satisfied; and
   deactivating the alarm when the criterion is no longer satisfied.

8. A system for protecting against impact between a vehicle and an object in a facility that houses the vehicle, the system comprising:
   a measurement module configured to be spaced apart from a surface of the facility and to obtain measurements, each corresponding to a distance from the measurement module;
   a detection module coupled to the measurement module and comprising a dataset for a monitored plane relative to the surface, the monitored plane defined by a plurality of baseline measurements, the detection module configured to:
      obtain a measurement from the measurement module; and
      evaluate the measurement relative to a corresponding baseline measurement to determine if a criterion indicative of an intrusion of the monitored plane is satisfied.

9. The system of claim 8, wherein each of the plurality of baseline measurements: 1) corresponds to a distance between the measurement module and one of a plurality of virtual ends of the monitored plane, and 2) is identified by an angle parameter.

10. The system of claim 9, wherein the plurality of virtual ends of the monitored plane comprises four ends defining a rectangular monitored plane.

11. The system of claim 8, wherein the measurement module comprises:
   a motor configured to rotate at a rotation rate; and
   a sensor coupled to the motor and configured to output a beam every n degrees of rotation.

12. The system of claim 11, wherein the criterion is satisfied when the measurement at an n degree of rotation is less than a value that is based on the corresponding baseline measurement identified by the n degree of rotation.

13. The system of claim 8, wherein each of the measurement and the corresponding baseline measurement are associated with a same parameter of the measurement module.

14. The system of claim 13, wherein the same parameter of the measurement module comprises an angle parameter.

15. The system of claim 8, wherein the detection module is further configured to output an alarm activation signal to activate and alarm when the criterion is satisfied.

16. The system of claim 15, wherein the detection module is further configured to:
   after activating the alarm, evaluate a subsequent measurement of the measurement relative to the corresponding baseline measurement to determine if the criterion indicative of the intrusion of the monitored plane is no longer satisfied; and
   deactivate the alarm when the criterion is no longer satisfied.

17. A system for protecting against impact between a vehicle and a facility, the system comprising:
   a measurement module associated with a first physical surface of the facility and configured to obtain a plurality of baseline measurements;
   a learning module coupled to the measurement module and configured to:
      receive the plurality of baseline measurements from the measurement module; and
      create a first monitored plane relative to the first physical surface based on the plurality of baseline measurements; and
   a detection module coupled to the measurement module and configured to:
      obtain a subsequent measurement from the measurement module; and
      evaluate the subsequent measurement relative to a corresponding baseline measurement to determine if a criterion indicative of an intrusion of the first monitored plane is satisfied.

18. The system of claim 17, wherein each of the plurality of baseline measurements: 1) corresponds to a distance between the measurement module and an object impeding a beam transmitted by the measurement module, and 2) is identified by an angle parameter.

19. The system of claim 17, wherein each of the subsequent measurement and the corresponding baseline measurement are associated with a same parameter of the measurement module.

20. The system of claim 19, wherein the same parameter of the measurement module comprises an angle parameter.

* * * * *